(12) United States Patent  (10) Patent No.: US 8,004,778 B2
Matsumoto et al.  (45) Date of Patent: Aug. 23, 2011

(54) ACHROMATIC LENS SYSTEM AND OPTICAL APPARATUS

(75) Inventors: Miho Matsumoto, Tokyo (JP); Akiko Miyakawa, Sagamihara (JP); Toshihiko Kurata, Yamato (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 12/539,607

(22) Filed: Aug. 11, 2009

(65) Prior Publication Data

US 2009/0303600 A1  Dec. 10, 2009

Related U.S. Application Data

(63) Continuation of application No. PCT/JP2008/052596, filed on Feb. 8, 2008.

(30) Foreign Application Priority Data

Feb. 13, 2007 (JP) ................................. 2007-032430

(51) Int. Cl.
 *G02B 9/04* (2006.01)
(52) U.S. Cl. ...................... 359/795; 359/576; 359/796
(58) Field of Classification Search .................. 359/566, 359/576, 691, 692, 742, 743, 795, 796
 See application file for complete search history.

(56) References Cited

U.S. PATENT DOCUMENTS

| 6,124,981 | A * | 9/2000 | Ogawa ..................... 359/675 |
| 6,639,721 | B2 * | 10/2003 | Endo ......................... 359/566 |
| 2001/0055157 | A1 * | 12/2001 | Shirasuna ................. 359/566 |
| 2002/0196560 | A1 * | 12/2002 | Endo ......................... 359/691 |
| 2003/0048548 | A1 * | 3/2003 | Noda ......................... 359/785 |
| 2003/0231396 | A1 | 12/2003 | Nakai | |
| 2004/0042102 | A1 | 3/2004 | Ukuda | |
| 2005/0168807 | A1 | 8/2005 | Endo | |
| 2008/0094712 | A1 | 4/2008 | Miyakawa | |
| 2008/0107903 | A1 | 5/2008 | Miyakawa et al. | |

FOREIGN PATENT DOCUMENTS

| JP | 59-109326 A | 6/1984 |
| JP | 4-151242 A | 5/1992 |
| JP | 2001-183590 A | 7/2001 |
| JP | 2004-078166 A | 3/2004 |

FOREIGN PATENT DOCUMENTS

| JP | 2004-126396 A | 4/2004 |
| JP | 2004-145277 A | 5/2004 |
| JP | 2005-215389 A | 8/2005 |

OTHER PUBLICATIONS

"Introduction to Diffractive Optical Element", Optical Design Study Group, Optical Society of Japan, Japan Society of Applied Physics, 1997, pp. 30-31. "Introduction to Diffractive Optical Element", Optical Design Study Group, Optical Society of Japan, Japan Society of Applied Physics, pp. 30-31, 2008.

* cited by examiner

*Primary Examiner* — Alessandro Amari
(74) *Attorney, Agent, or Firm* — Miles & Stockbridge P.C.

(57) ABSTRACT

An achromatic lens system is provided with a cemented resin lens having positive refractive power constructed by a resin lens L11 having positive refractive power cemented with a resin lens L12 having negative refractive power, and a close-contact multi-layer type diffractive optical element L11E, the diffractive optical element L11E being disposed to an image side of the cemented resin lens, the diffractive optical element L11E being constructed by cementing two diffractive element members DE11, DE12 each made of different optical materials with each other, and the cemented surface thereof being a diffractive optical surface Gf on which grooves of a diffraction grating are formed, there by being lightweight and easily manufactured, capable of excellently correcting chromatic aberration and spherical aberration at the same time.

6 Claims, 21 Drawing Sheets

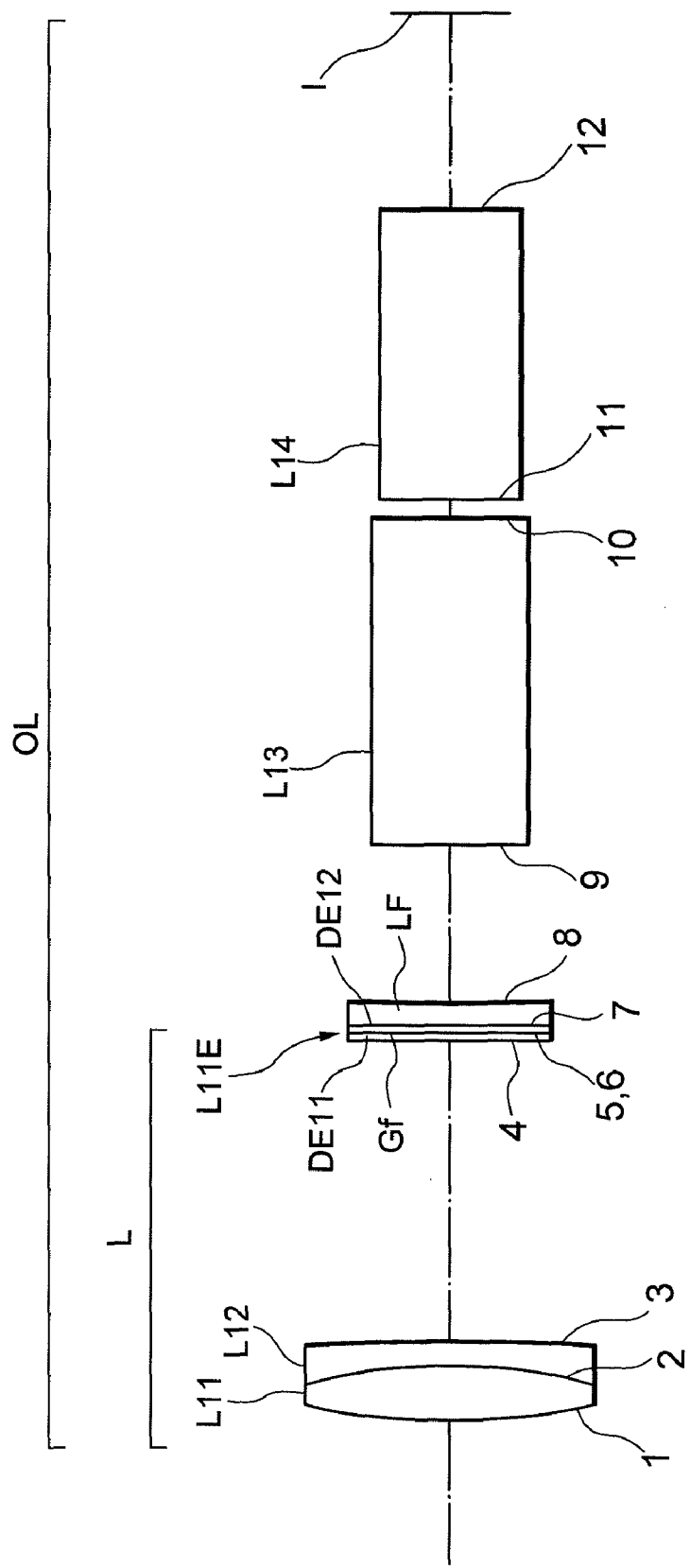

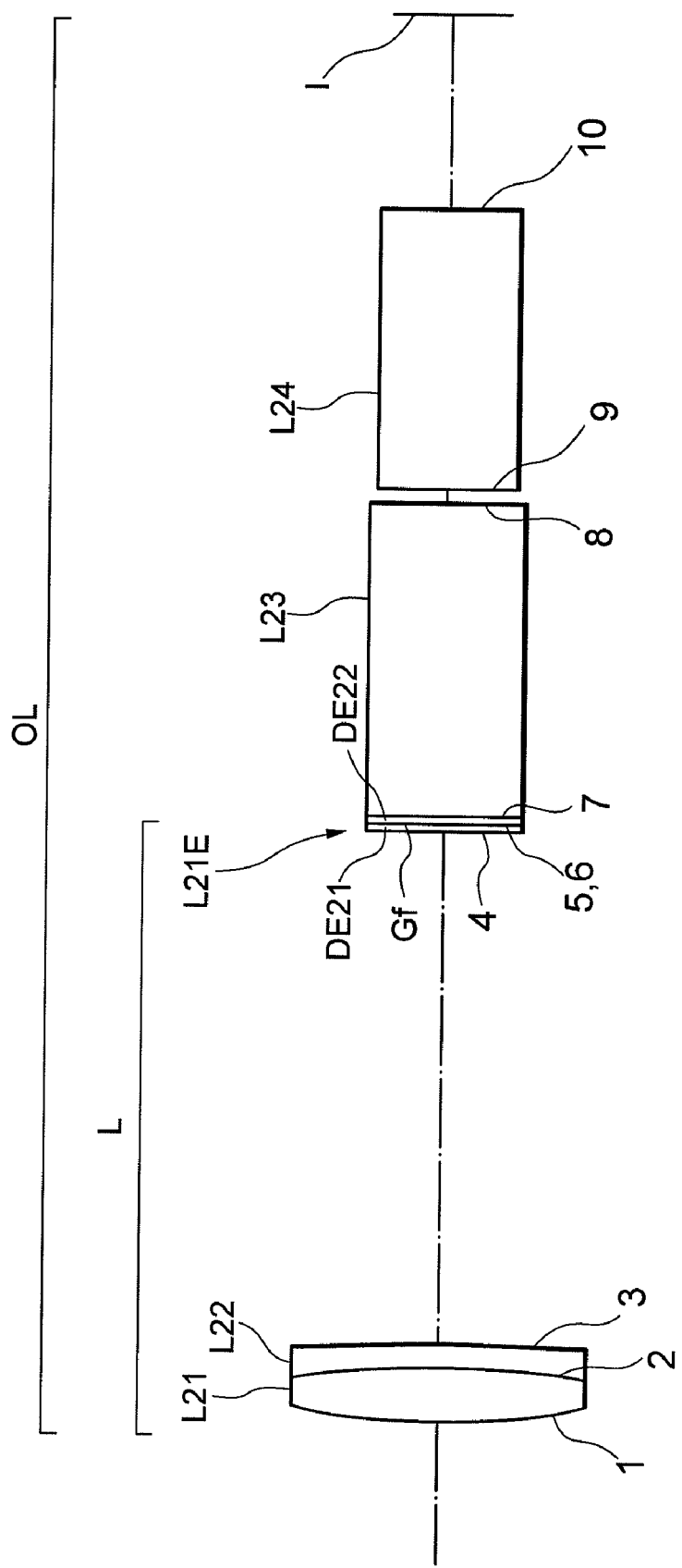

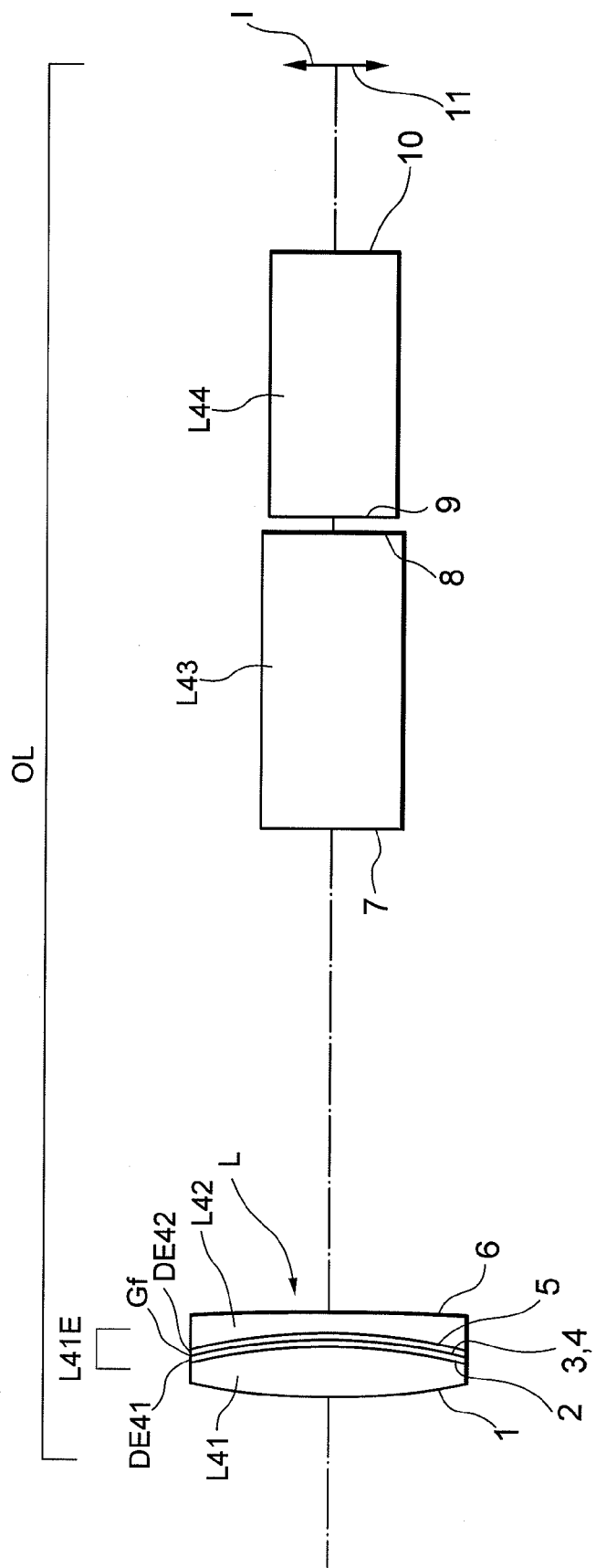

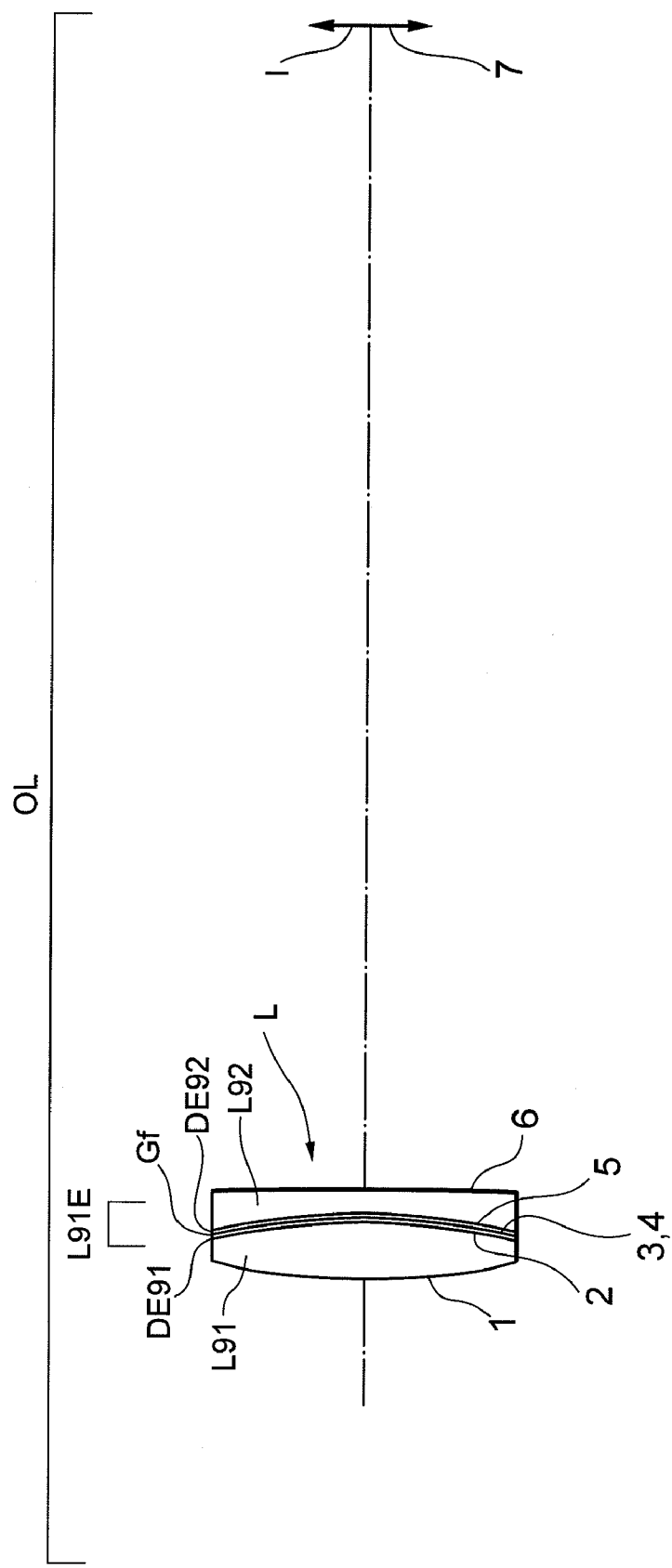

ACHROMATIC LENS SYSTEM AND OPTICAL APPARATUS

CROSS-REFERENCE TO RELATED APPLICATION

This application is a continuation of International Application No. PCT/JP2008/052596 filed Feb. 8, 2008.

TECHNICAL FIELD

The present invention relates to an achromatic lens system and an optical apparatus.

BACKGROUND ART

There has been proposed an achromatic lens system that is composed of an objective lens, an erecting optical system and an eyepiece, and equipped with a diffractive optical element disposed on an optical path of the erecting optical system (for example, see Japanese Patent Application Laid-Open No. 2001-183590).

However, in the above-described conventional achromatic lens system, since the objective lens is constructed by a glass material, weight-trimming thereof is not sufficient. Moreover, since the objective lens is a single lens, chromatic aberration and spherical aberration cannot be sufficiently corrected.

DISCLOSURE OF THE INVENTION

The present invention is made in view of the aforementioned problems, and has an object to provide an achromatic lens system being light and easy to be manufactured, capable of excellently correcting chromatic aberration and spherical aberration at the same time, and an optical apparatus using the same.

In order to solve the problems, according to a first aspect of the present invention, there is provided an achromatic lens system comprising: a cemented resin lens having positive refractive power constructed by a resin lens having positive refractive power cemented with a resin lens having negative refractive power; and a close-contact multi-layer type diffractive optical element provided to an image side of the cemented resin lens.

In the first aspect of the present invention, the following conditional expression (1) is preferably satisfied:

$$0.2 \leq |R/f| \leq 1.8 \quad (1)$$

where R denotes a radius of curvature of the cemented surface of the cemented resin lens, and f denotes a focal length of the achromatic lens system.

In the first aspect of the present invention, the following conditional expression (2) is preferably satisfied:

$$1.9 \leq N/D \leq 15 \quad (2)$$

where N denotes the number of grooves of a diffraction grating formed on a diffractive optical surface of the diffractive optical element, and D denotes an effective radius of the diffractive optical surface of the diffractive optical element.

According to a second aspect of the present invention, there is provided an achromatic lens system comprising: a resin lens having positive refractive power; a diffractive optical element; and a resin lens having negative refractive power; they being cemented with each other, and having positive refractive power as a whole, the diffractive optical element being constructed by cementing two diffractive element members made of different optical materials with each other, and the cemented surface thereof being a diffractive optical surface on which grooves of a diffraction grating are formed.

In the second aspect of the present invention, it is preferable that the following conditional expression (1') is satisfied:

$$0.2 \leq |R/f| \leq 1.3 \quad (1')$$

where R denotes a radius of curvature of the-resin-lens-having-negative-refractive-power side surface of the resin lens having positive refractive power, and f denotes a focal length of the achromatic lens system.

In the second aspect of the present invention, it is preferable that the following conditional expression (2') is satisfied:

$$0.3 \leq N/D \leq 1.8 \quad (2')$$

where N denotes the number of grooves of the diffraction grating formed on the diffractive optical surface of the diffractive optical element, and D denotes an effective radius of the diffractive optical surface of the diffractive optical element.

In the first or second aspect of the present invention, it is preferable that the following conditional expressions (3), (4), (5) and (6) are satisfied:

$$nd1 \leq 1.54 \quad (3)$$

$$0.0145 \leq nF1 - nC1 \quad (4)$$

$$1.55 \leq nd2 \quad (5)$$

$$nF2 - nC2 \leq 0.013 \quad (6)$$

where nd1 denotes a refractive index of a material of the diffractive element member having a lower refractive index and a smaller Abbe number among the two diffractive element members of the diffractive optical element at d-line (wavelength λ=587.562 nm), nF1 denotes a refractive index of a material of the diffractive element member having a lower refractive index and a smaller Abbe number among the two diffractive element members of the diffractive optical element at F-line (wavelength λ=486.133 nm), nC1 denotes a refractive index of a material of the diffractive element member having a lower refractive index and a smaller Abbe number among the two diffractive element members of the diffractive optical element at C-line (wavelength λ=656.273 nm), nd2 denotes a refractive index of a material of the diffractive element member having a higher refractive index and a larger Abbe number among the two diffractive element members of the diffractive optical element at d-line (wavelength λ=587.562 nm), nF2 denotes a refractive index of a material of the diffractive element member having a higher refractive index and a larger Abbe number among the two diffractive element members of the diffractive optical element at F-line (wavelength λ=486.133 nm), and nC2 denotes a refractive index of a material of the diffractive element member having a higher refractive index and a larger Abbe number among the two diffractive element members of the diffractive optical element at C-line (wavelength λ=656.273 nm).

In the first or second aspect of the present invention, it is preferable that the achromatic lens system includes at least one aspherical surface.

According to a third aspect of the present invention, there is provided an optical apparatus equipped with the achromatic lens system according to the first or second aspect.

According to the present invention, it becomes possible to provide an achromatic lens system being light and easy to be manufactured, capable of excellently correcting chromatic aberration and spherical aberration at the same time, and an optical apparatus using the same.

BRIEF DESCRIPTION OF THE DRAWINGS

FIG. 1 is a sectional view showing a lens system including an achromatic lens system according to Example 1 of the present invention.

FIG. 3 is a sectional view showing a lens system including an achromatic lens system according to Example 2 of the present invention.

FIG. 7 is a sectional view showing a lens system including an achromatic lens system according to Example 4 of the present invention.

FIG. 17 is a sectional view showing a lens system including an achromatic lens system according to Example 9 of the present invention.

THE EMBODIMENT FOR CARRYING OUT THE INVENTION

Figure 2A:
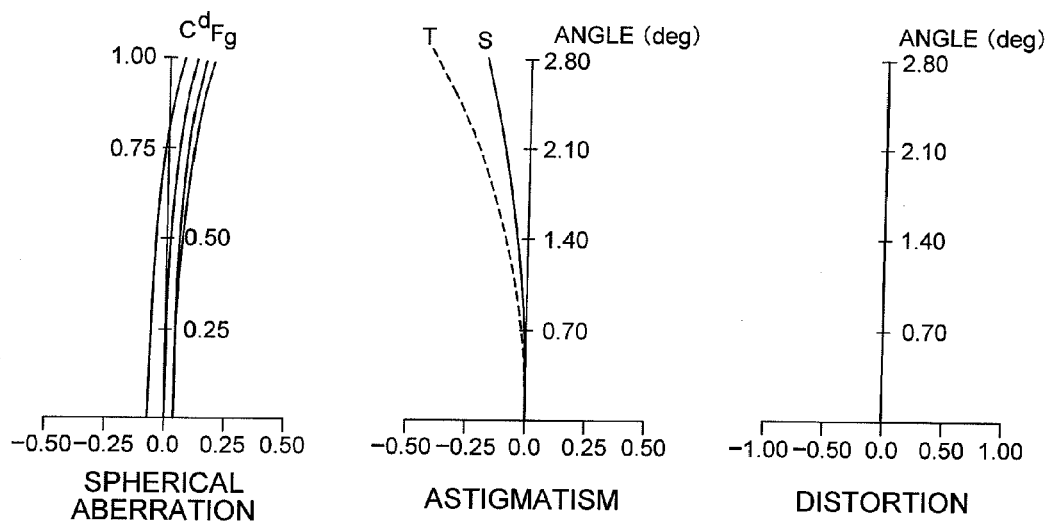
FIGS. 2A and 2B are graphs respectively showing various aberrations and white light MTF value on the optical axis of the lens system including the achromatic lens system according to Example 1 of the present invention.

An achromatic lens system and an optical apparatus according to an embodiment of the present invention are explained below.

An achromatic lens system according to the present invention includes a cemented resin lens having positive refractive power constructed by a resin lens having positive refractive power cemented with a resin lens having negative refractive power, and a diffractive optical element. The diffractive optical element is disposed to an image side of the cemented resin lens, constructed by cementing two diffractive element members each being made of different optical materials, and the cemented surface thereof is a diffractive optical surface on which grooves of a diffraction grating are formed.

As described above, an achromatic lens system according to the present invention includes a diffractive optical element for correcting chromatic aberration. The diffractive optical element is equipped with a diffractive optical surface on which fine groove or slit like grating structure is formed concentrically, and has a characteristic that diffracts light incident on the diffractive optical surface in a direction determined by a pitch of the grating, in other words, an interval of grooves of the diffraction grating, and a wavelength of the incident light.

This kind of diffractive optical elements are used in various optical systems, and, for example, a one used for a lens converging certain order diffracted light into a point has been known. In such diffractive optical surface of the diffractive optical element, since dispersion characteristic is opposite to that of an ordinary glass such that refractive index becomes small as the wavelength of the light becomes short, in other words, negative dispersion characteristic, a large achromatic effect can be obtained. Accordingly, by using the diffractive optical element, it becomes possible to excellently correct chromatic aberration.

As described above, the diffractive optical element in an achromatic lens system according to the present invention is a so-called close-contact multi-layer type diffractive optical element that two diffractive element members each made of different optical materials are cemented each other, and the cemented surface is constructed as a diffractive optical surface, so that diffraction efficiency can be increased over broad wavelength range from g-line (wavelength $\lambda=435.835$ nm) to C-line (wavelength $\lambda=656.273$ nm). Accordingly, an achromatic lens system using such a diffractive optical element according to the present invention makes it possible to be used over broad wavelength range from wavelength $\lambda=435.835$ nm to 656.273 nm. Incidentally, the above-described diffraction efficiency shows a ratio $\eta$ ($=I1/I0\times100\%$) between light intensity of the first order diffracted light I1 and that of incident light I0.

The close-contact multi-layer type diffractive optical element can simplify manufacturing process thereof in comparison with a so-called separate type diffractive optical element that two diffractive element members each of which grooves of a diffraction grating are formed on are disposed with facing the grooves of the diffraction gratings in close vicinity to each other, so that mass-production efficiency is excellent, and diffraction efficiency with respect to incident angle is good. Accordingly, an achromatic lens system according to the present invention using such a diffractive optical element, in other words, a close-contact multi-layer type diffractive optical element becomes easy to be manufactured and has better diffraction efficiency.

As described above, by disposing cemented resin lens having positive refractive power constructed by a resin lens having positive refractive power cemented with a resin lens having negative refractive power to an object side of a diffractive optical element, an achromatic lens system according to the present invention makes it possible to excellently correct chromatic aberration and spherical aberration at the same time with trimming weight thereof. Since the diffractive optical element is provided separately from the cemented resin lens, the diffractive optical element can be disposed at a position on the optical path where a diameter of bundle of rays is small in comparison with a case that the diffractive optical element is formed integrally to the cemented resin lens having a large diameter. Accordingly, the diffractive optical element can be small, so that manufacturing thereof can be easy.

As described above, by using a cemented resin lens and a close-contact multi-layer type diffractive optical element, an achromatic lens system according to the present invention makes it possible to be lightweight and easy to be manufactured, and to excellently correct chromatic aberration and spherical aberration at the same time.

An achromatic lens system according to the present invention preferably satisfies the following conditional expression (1):

$$0.2 \leq |R/f| \leq 1.8 \quad (1)$$

where R denotes a radius of curvature of the cemented surface of the cemented resin lens, and f denotes a focal length of the achromatic lens system.

Conditional expression (1) defines the radius of curvature of the cemented surface of the cemented resin lens in the achromatic lens system according to the present invention.

When the value falls below the lower limit of conditional expression (1), longitudinal chromatic aberration becomes undercorrected at C-line and F-line upon correcting at d-line and g-line, so that secondary spectrum increases. Accordingly, white light MTF value falls off, so that it becomes impossible to obtain excellent optical performance in the achromatic lens system according to the present invention.

On the other hand, when the value exceeds the upper limit of conditional expression (1), longitudinal chromatic aberration becomes overcorrected at C-line and F-line upon correcting at d-line and g-line, so that secondary spectrum increases. Accordingly, white light MTF value falls off, so that it becomes impossible to obtain excellent optical performance in the achromatic lens system according to the present invention.

In the achromatic lens system according to the present invention, the following conditional expression (2) is preferably satisfied:

$$1.9 \leq N/D \leq 15 \quad (2)$$

where N denotes the number (lines) of grooves of the diffraction grating on the diffractive optical surface in the diffractive optical element, and D denotes an effective diameter (mm) of the diffractive optical surface in the diffractive optical element.

Conditional expression (2) defines an appropriate range of the number of the grooves of the diffraction grating and the effective diameter of the diffractive optical surface in the achromatic lens system according to the present invention.

When the ratio falls below the lower limit of conditional expression (2), longitudinal chromatic aberration becomes undercorrected at C-line and F-line (wavelength λ=486.133 nm) upon correcting at d-line (wavelength λ=587.562 nm) and g-line, so that secondary spectrum increases. Accordingly, white light MTF (Modulation Transfer Function) value falls off, so that it becomes impossible to obtain excellent optical performance in the achromatic lens system according to the present invention.

On the other hand, when the ratio exceeds the upper limit of conditional expression (2), longitudinal chromatic aberration becomes overcorrected at C-line and F-line upon correcting at d-line and g-line, so that secondary spectrum increases. Accordingly, white light MTF value falls off, so that it becomes impossible to obtain excellent optical performance in the achromatic lens system according to the present invention.

Moreover, an achromatic lens system according to the present invention includes a resin lens having positive refractive power, a diffractive optical element, and a resin lens having negative refractive power. They are cemented in a body and have positive refractive power as a whole. The diffractive optical element is constructed by cementing two diffractive element members each being made of different optical materials, and the cemented surface thereof is a diffractive optical surface on which grooves of diffraction grating are formed.

When a close-contact multi-layer type diffractive optical element is disposed in the achromatic lens, the following conditional expression (1') is preferably satisfied:

$$0.2 \leq |R/f| \leq 1.3 \quad (1')$$

where R denotes a radius of curvature of the cemented surface of the cemented resin lens, and f denotes a focal length of the achromatic lens system.

When a close-contact multi-layer type diffractive optical element is disposed in the achromatic lens, the following conditional expression (2') is preferably satisfied:

$$0.3 \leq N/D \leq 1.8 \quad (2')$$

where N denotes the number (lines) of grooves of the diffraction grating on the diffractive optical surface in the diffractive optical element, and D denotes an effective diameter (mm) of the diffractive optical surface in the diffractive optical element.

Moreover, an achromatic lens system according to the present invention preferably includes at least one aspherical surface.

With this configuration, an achromatic lens system according to the present invention makes it possible to excellently correct chromatic aberration and spherical aberration at the same time.

In an achromatic lens system according to the present invention, the two diffractive element members are different with each other, and at least one of them is preferably made of an ultraviolet curing resin.

With this configuration, it becomes possible to increase mass-productivity. For further details, when a diffractive optical element according to the present invention is manufactured by using a resin and an ultraviolet curing resin as a diffractive element member, the following method can be adopted that a diffraction grating surface is formed on the resin by injection molding using a mold on which grooves of the diffraction grating are formed or by cutting and polishing, and then an ultraviolet curing resin is dripped down on the diffraction grating surface, and irradiated by ultraviolet light to be cured. With adopting the method, the following works become unnecessary that diffraction grating surfaces corresponding to the two diffractive element members are separately formed, and aligned, so that mass-productivity can be increased.

When a diffractive optical element according to the present invention is manufactured by using two different ultraviolet curing resin materials as the diffractive element members, the following method can be adopted such that one ultraviolet curing resin dripped on a substrate is molded by a mold on which diffraction grating is formed, and irradiated with ultraviolet light to be cured, and the other ultraviolet curing resin is dripped on the grating surface formed by molding, and irradiated with ultraviolet light to be cured. With adopting the method, the diffraction grating surface can be manufactured by using only one mold, so that the following works become unnecessary in the similar manner as described above such that diffraction grating surfaces corresponding to two diffractive element members are separately formed, and aligned. Since the diffraction grating surface can be manufactured by just carrying out the work twice that ultraviolet curing resin is dripped on a mold, and irradiated by ultraviolet light to be cured, mass-productivity can be increased.

An achromatic lens system according to the present invention preferably satisfies the following conditional expressions (3), (4), (5), (6):

$$nd1 \leq 1.54 \quad (3)$$

$$0.0145 \leq nF1-nC1 \quad (4)$$

$$1.55 \leq nd2 \quad (5)$$

$$nF2-nC2 \leq 0.013 \quad (6)$$

where nd1 denotes a refractive index of a material of the diffractive element member having a lower refractive index and a smaller Abbe number among the two diffractive element members of the diffractive optical element at d-line (wavelength $\lambda$=587.562 nm), nF1 denotes a refractive index of a material of the diffractive element member having a lower refractive index and a smaller Abbe number among the two diffractive element members of the diffractive optical element at F-line (wavelength $\lambda$=486.133 nm), nF1 denotes a refractive index of a material of the diffractive element member having a lower refractive index and a smaller Abbe number among the two diffractive element members of the diffractive optical element at C-line (wavelength $\lambda$=656.273 nm), nd2 denotes a refractive index of a material of the diffractive element member having a higher refractive index and a larger Abbe number among the two diffractive element members of the diffractive optical element at d-line (wavelength $\lambda$=587.562 nm), nF2 denotes a refractive index of a material of the diffractive element member having a higher refractive index and a larger Abbe number among the two diffractive element members of the diffractive optical element at F-line (wavelength $\lambda$=486.133 nm), and nC2 denotes a refractive index of a material of the diffractive element member having a higher refractive index and a larger Abbe number among the two diffractive element members of the diffractive optical element at C-line (wavelength $\lambda$=656.273 nm).

Conditional expressions (3), (4), (5), (6) define materials of two diffractive element members composing the diffractive optical element of the achromatic lens system according to the present invention, in other words, dispersion with respect to F-line and C-line, which is nF-nC, and refractive indices of two different ultraviolet curing resin materials. Where nF denotes a refractive index at F-line, and nC denotes a refractive index at C-line.

With satisfying these conditional expressions, an achromatic lens system according to the present invention makes it possible to form a diffractive optical surface having excellent performance by closely contacting two diffractive element members made of different ultraviolet curing resin materials, so that it becomes possible to realize diffraction efficiency of 90% or more over wide wavelength range from g-line to C-line. Resin materials as such optical materials are shown in, for example, Japanese Patent Application Nos. 2004-367607 and 2005-237573.

When respective values fall below the lower limit, or exceed the upper limit of respective conditional expressions (3), (4), (5), (6), an achromatic lens system according to the present invention becomes difficult to obtain diffraction efficiency of 90% or more over broad wavelength range, so that it becomes difficult to keep the shape of the close-contact multi-layer type diffractive optical element.

Diffraction efficiency is derived by the following expression:

$$\eta(m)=\{(\sin(a-m)\pi)/((a-m)\pi)\}^2$$

$$a=\{(n1-1)d-(n2-1)d\}/\lambda$$

where $\eta(m)$ denotes diffraction efficiency of m-th order diffracted light, m denotes an order of diffraction, d denotes a height of grooves of diffractive element member, n1 denotes a refractive index of one material forming the diffraction grating surface (diffractive optical surface), n2 denotes a refractive index of the other material forming the diffraction grating surface (diffractive optical surface), and $\lambda$ denotes a wavelength.

In a combination of resin materials used in numerical examples, the height of grooves of the diffractive element member is 20.05 μm, diffraction efficiency of the first order diffracted light is 98% at g-line (wavelength $\lambda$=435.835 nm), 98% at F-line (wavelength $\lambda$=486.133 nm), 100% at d-line (wavelength $\lambda$=587.562 nm), and 98% at C-line (wavelength $\lambda$=656.273 nm), so that it becomes possible to realize a close-contact multi-layer type diffractive optical element having excellent diffraction efficiency of 98% or more over broad wavelength range.

An optical apparatus according to the present invention is equipped with the achromatic lens system described above.

With this configuration, it becomes possible to realize an optical apparatus being lightweight and easy to be manufactured, capable of excellently correcting chromatic aberration and spherical aberration at the same time.

An achromatic lens system according to each numerical example is explained below in detail with reference to accompanying drawings.

EXAMPLE 1

FIG. 1 is a sectional view showing a lens system including an achromatic lens system according to Example 1 of the present invention.

As shown in FIG. 1, a lens system OL equipped with an achromatic lens system L according to the present example is composed of, in order from an object side along an optical axis, the achromatic lens system L, a plano-concave lens LF for fine adjustment of an image plane by moving along the optical axis, an erecting prism L13, and an erecting prism L14. Although the optical path of the lens system OL is bent by the erecting prisms L13 and L14, it is shown with extending itself in FIG. 1.

The achromatic lens system L is composed of, in order from the object side along the optical path, a cemented positive resin lens constructed by a double convex positive resin lens L11 cemented with a negative meniscus resin lens L12 having a concave surface facing the object side, and a diffractive optical element L11E formed on the object side surface of a plano-concave lens LF. An aspherical surface is formed on the image side surface of the negative meniscus resin lens L12.

The diffractive optical element L11E is a close-contact multi-layer type diffractive optical element for excellently correcting chromatic aberration, in particular, longitudinal chromatic aberration and obtaining high diffraction efficiency, and composed of a close-contact structure constructed by, in order from the object side along the optical axis, a first diffractive element member DE11 made of an ultraviolet curing resin material cemented with a second diffractive element member DE12 made of an ultraviolet curing resin material different from that of the first diffractive element member DE11, and the cemented surface becomes a diffractive optical surface Gf on which grooves of a diffraction grating are formed.

Various values associated with the lens system OL equipped with the achromatic lens system according to the present example are listed in Table 2.

In [Specifications], f denotes a focal length (mm), and FNO denotes an f-number.

In [Lens Data], "Surface Number" denotes the surface number counted in order from the object side, "r" denotes a radius of curvature (mm) of an optical surface (when the optical surface is an aspherical surface, it is a radius of curvature of a reference sphere), "d" denotes a distance (mm) to the next surface, "vd" denotes an Abbe number at d-line, and "n(d)" denotes a refractive index at d-line. Radius of curvature corresponding to ∞ means a plane surface.

In [Aspherical Data], aspherical coefficients upon defining the aspherical surface by the following expressions (A) and (b) are shown:

$$Z(y) = (y^2/r)/[1+[1-(1+\kappa)(y^2/r^2)]^{1/2}] + C2 \times y^2 + C4 \times y^4 + C6 \times y^6 + C8 \times y^8 + C10 \times y^{10} \quad (A)$$

$$R = 1/\{(1/r) + 2C2\} \quad (B)$$

where y denotes a vertical height from the optical axis (incident height), Z(y) denotes a distance along the optical axis from the tangent surface at the vertex of the aspherical surface to the aspherical surface at the vertical height y from the optical axis (an aspherical amount or a sag amount), r denotes a radius of curvature of a reference sphere, R denotes a paraxial radius of curvature, K denotes a conical coefficient, C2, C4, C6, C8, C10 denote aspherical coefficients of 2, 4, 6, 8, and 10-th order, respectively. "E-n" denotes "×10$^{-n}$" such that "1.234E-5" denotes "1.234×10$^{-5}$".

In the present example, the diffractive optical surface Gf is denoted by ordinary refractive index and a high refractive index method using the above-described aspherical expressions (A) and (B). The high refractive index method uses a fixed equivalent relation between expression showing an aspherical surface and a pitch of the grating of the diffractive optical surface, and the diffractive optical surface Gf in the present example is shown by the data of the high refractive index and the above-described aspherical expressions (A) and (B) and coefficients thereof. In the present example, as an object to be calculated aberration characteristic, d-line, g-line, C-line, and F-line are selected. Each wavelength d-line, g-line, C-line, and F-line selected in the present example and the specific refractive index value of the diffractive optical surface Gf set to each spectrum line are shown below in Table 1. The high refractive index method is precisely explained in "Introduction to the diffractive optical element": supervised by Optical Society of Japan in Japan Society of Applied Physics (1997).

TABLE 1

|  | wavelength (nm) | refractive index |
|---|---|---|
| d-line | 587.562 | 10001.0000 |
| g-line | 435.835 | 7418.6853 |
| C-line | 656.273 | 11170.4255 |
| F-line | 486.133 | 8274.7311 |

In the tables for various values, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm".

The explanations of each table is the same in the other Examples.

TABLE 2

| [Specifications] | | | | |
|---|---|---|---|---|
| f = | | | 108.0 | |
| FNO = | | | 4.3 | |

| [Lens Data] | | | | |
|---|---|---|---|---|
| Surface Number | r | d | vd | n(d) |
| 1 | 51.2163 | 5.0 | 56.21 | 1.524440 |
| 2 | −68.5157 | 2.0 | 30.3 | 1.582760 |
| 3 | −501.4863 | 27.3 | | 1.000000 |
| 4 | ∞ | 0.5 | 34.7 | 1.527600 |
| 5 | ∞ | 0.0 | −3.45 | n1 |
| 6 | ∞ | 0.5 | 50.2 | 1.556900 |
| 7 | ∞ | 2.0 | 64.2 | 1.516800 |
| 8 | 217.3074 | 14.2 | | 1.000000 |
| 9 | ∞ | 30.0 | 56.1 | 1.568829 |
| 10 | ∞ | 1.4 | | 1.000000 |
| 11 | ∞ | 26.0 | 56.1 | 1.568829 |
| 12 | ∞ | 18.5 | | 1.000000 |

[Diffractive Optical Element L11E data]

Surface Number = 5
n(d) = 10001.0000 = n1
n(g) = 7418.6853
n(C) = 11170.4255
n(F) = 8274.7311
The number of grooves of the diffraction grating in the diffractive optical surface Gf = 22
Effective radius of the diffractive optical surface Gf = 8.5

| [Refractive index of the resin material] | | | |
|---|---|---|---|
| | nC | nd | nF |
| lower index | 1.523300 | 1.527600 | 1.538500 |
| higher index | 1.553700 | 1.556900 | 1.564800 |

TABLE 2-continued

[Aspherical Data]

Surface Number = 3

κ = 0.0000
C2 = 0.00000E+00
C4 = 3.03243E−07
C6 = 0.00000E+00
C8 = 0.00000E+00
C10 = 0.00000E+00

Surface Number = 6

κ = 0.0000
C2 = −2.03038E−08
C4 = 3.11380E−11
C6 = 0.00000E+00
C8 = 0.00000E+00
C10 = 0.00000E+00

[Values for Conditional Expressions]

(1) |R/f| = 0.634
(2) N/D = 2.59
(3) nd1 = 1.527600
(4) nF1 − nC1 = 0.0152
(5) nd2 = 1.556900
(6) nF2 − nC2 = 0.011

Figure 2B:
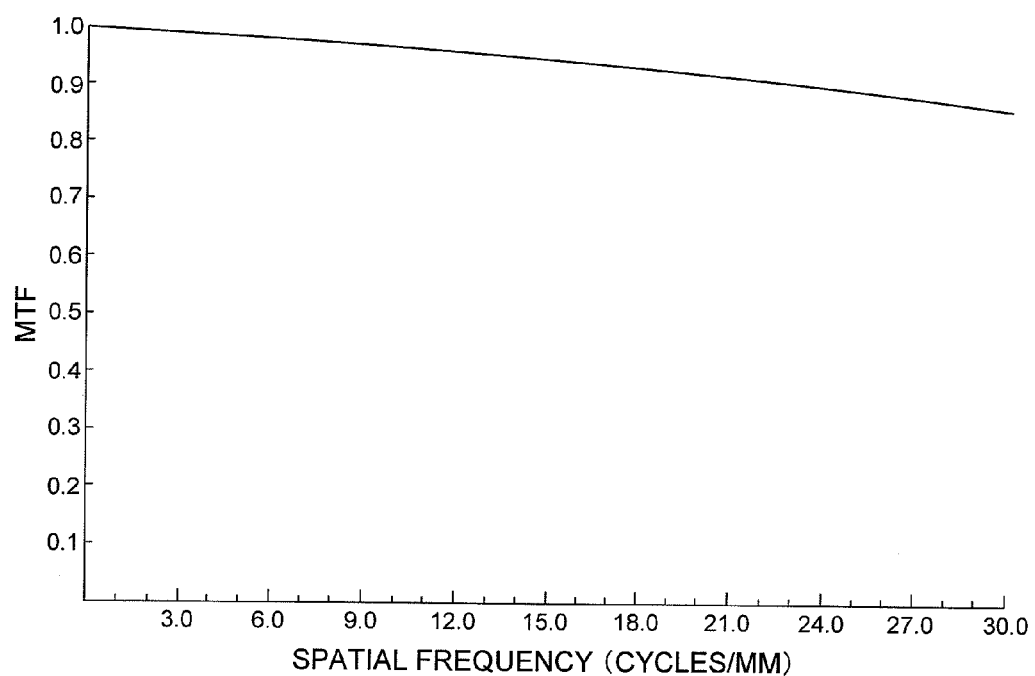

FIGS. 2A and 2B are graphs respectively showing various aberrations and white light MTF value on the optical axis of the lens system including the achromatic lens system according to Example 1 of the present invention.

In graphs showing spherical aberration, d denotes d-line, g denotes g-line, C denotes C-line, and F denotes F-line. In graphs showing astigmatism, a solid line indicates a sagittal image plane, and a broken line indicates a meridional image plane. The above-described explanations regarding various aberration graphs are the same as the other Examples.

As is apparent from the respective aberration graphs and white light MTF value of 0.855 with respect to the spatial frequency of 30 lines/mm, the lens system equipped with the achromatic lens system according to the present example shows superb optical performance as a result of excellent corrections to various aberrations in particular to longitudinal chromatic aberration as well as spherical aberration at the same time.

In the present example, although the diffractive optical element L11E is formed on the object side surface of the plano-concave lens LF, it is not limited to this position, and it is possible to form on the image side surface of the plano-concave lens LF.

EXAMPLE 2

FIG. 3 is a sectional view showing a lens system including an achromatic lens system according to Example 2 of the present invention.

As shown in FIG. 3, a lens system OL equipped with an achromatic lens system L according to the present example is composed of, in order from an object side along an optical axis, the achromatic lens system L, an erecting prism L23, and an erecting prism L24. Although the optical path of the lens system OL is bent by the erecting prisms L23 and L24, it is shown with extending itself in FIG. 3.

The achromatic lens system L is composed of, in order from the object side along the optical axis, a cemented positive resin lens constructed by a double convex positive resin lens L21 cemented with a negative meniscus resin lens L22 having a concave surface facing the object side, and a diffractive optical element L21E formed on the object side surface of the erecting prism L23. An aspherical surface is formed on an image side surface of the negative meniscus resin lens L22.

The diffractive optical element L21E is a close-contact multi-layer type diffractive optical element for excellently correcting chromatic aberration, in particular, longitudinal chromatic aberration and obtaining high diffraction efficiency, and composed of a close-contact structure constructed by, in order from the object side along the optical axis, a first diffractive element member DE21 made of an ultraviolet curing resin material cemented with a second diffractive element member DE22 made of an ultraviolet curing resin material different from that of the first diffractive element member DE21, and the cemented surface becomes a diffractive optical surface Gf on which grooves of a diffraction grating are formed.

Various values associated with the lens system OL equipped with the achromatic lens system according to the present example are listed in Table 3.

TABLE 3

[Specifications]

f = 108.0
FNO = 4.3

[Lens Data]

| Surface Number | r | d | νd | n(d) |
|---|---|---|---|---|
| 1 | 58.4455 | 5.0 | 56.2 | 1.532700 |
| 2 | −101.4265 | 2.0 | 25.6 | 1.613270 |
| 3 | −856.3860 | 48.7 | | 1.000000 |
| 4 | ∞ | 0.4 | 34.7 | 1.527600 |
| 5 | ∞ | 0.0 | −3.45 | n1 |
| 6 | ∞ | 0.4 | 50.2 | 1.556900 |
| 7 | ∞ | 30.0 | 56.1 | 1.568829 |
| 8 | ∞ | 1.4 | | 1.000000 |
| 9 | ∞ | 26.0 | 56.1 | 1.568829 |
| 10 | ∞ | 18.5 | | 1.000000 |

[Diffractive Optical Element L21E data]

Surface Number = 5
n(d) = 10001.0000 = n1
n(g) = 7418.6853
n(C) = 11170.4255
n(F) = 8274.7311
The number of grooves of the diffraction grating in the diffractive optical surface Gf = 16
Effective radius of the diffractive optical surface Gf = 6.6

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 3

κ = 0.0000
C2 = 0.00000E+00
C4 = 3.06769E−07
C6 = 0.00000E+00
C8 = 0.00000E+00
C10 = 0.00000E+00

Surface Number = 6

κ = 0.0000
C2 = −2.24401E−08
C4 = 4.07458E−12
C6 = 0.00000E+00
C8 = 0.00000E+00

TABLE 3-continued

C10 = 0.00000E+00

[Values for Conditional Expressions]

(1) |R/f| = 0.939
(2) N/D = 2.42
(3) nd1 = 1.527600
(4) nF1 − nC1 = 0.0152
(5) nd2 = 1.556900
(6) nF2 − nC2 = 0.011

Figure 4A:
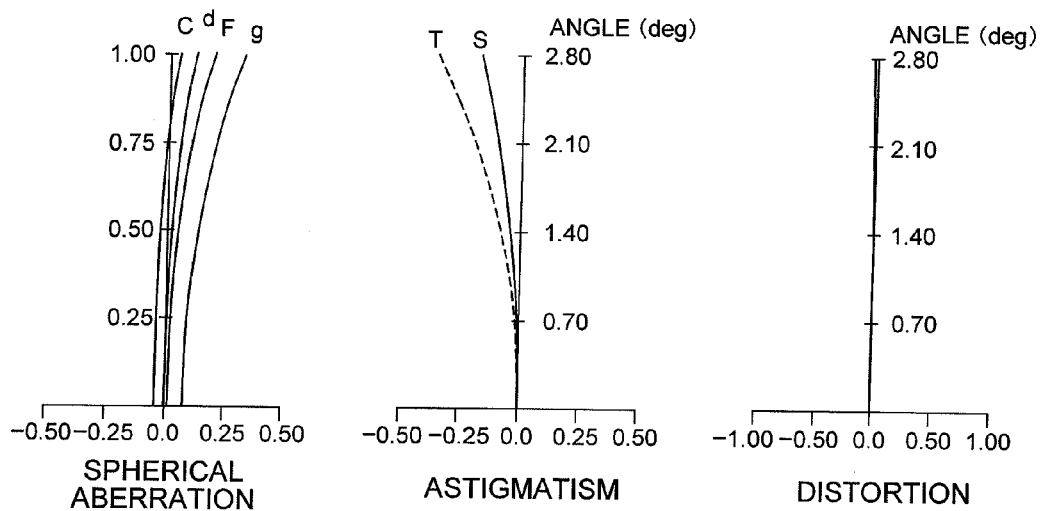
FIGS. 4A and 4B are graphs respectively showing various aberrations and white light MTF values on the optical axis of the lens system including the achromatic lens system according to Example 2 of the present invention.
Figure 4B:
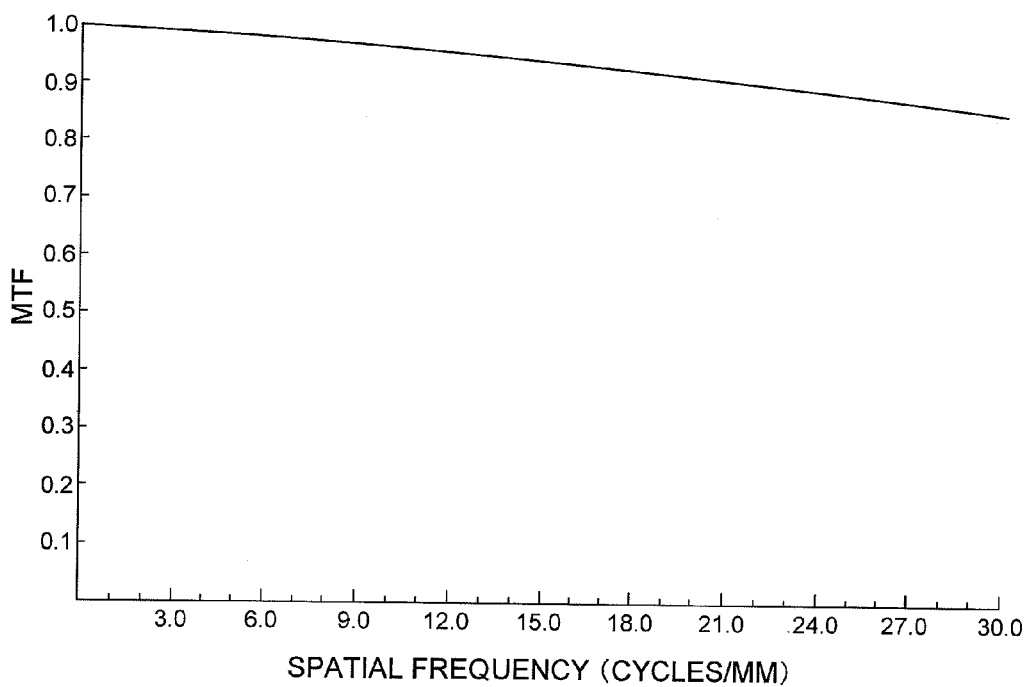

FIGS. 4A and 4B are graphs respectively showing various aberrations and white light MTF values on the optical axis of the lens system including the achromatic lens system according to Example 2 of the present invention.

As is apparent from the respective aberration graphs and white light MTF value of 0.841 with respect to the spatial frequency of 30 lines/mm, the lens system equipped with the achromatic lens system according to the present example shows superb optical performance as a result of excellent corrections to various aberrations in particular to longitudinal chromatic aberration.

In the present example, although the diffractive optical element L21E is formed on the object side surface of the erecting prism L23, it is not limited to this position, and it is possible to form on the image side surface of the erecting prism L23.

EXAMPLE 3

Figure 5:
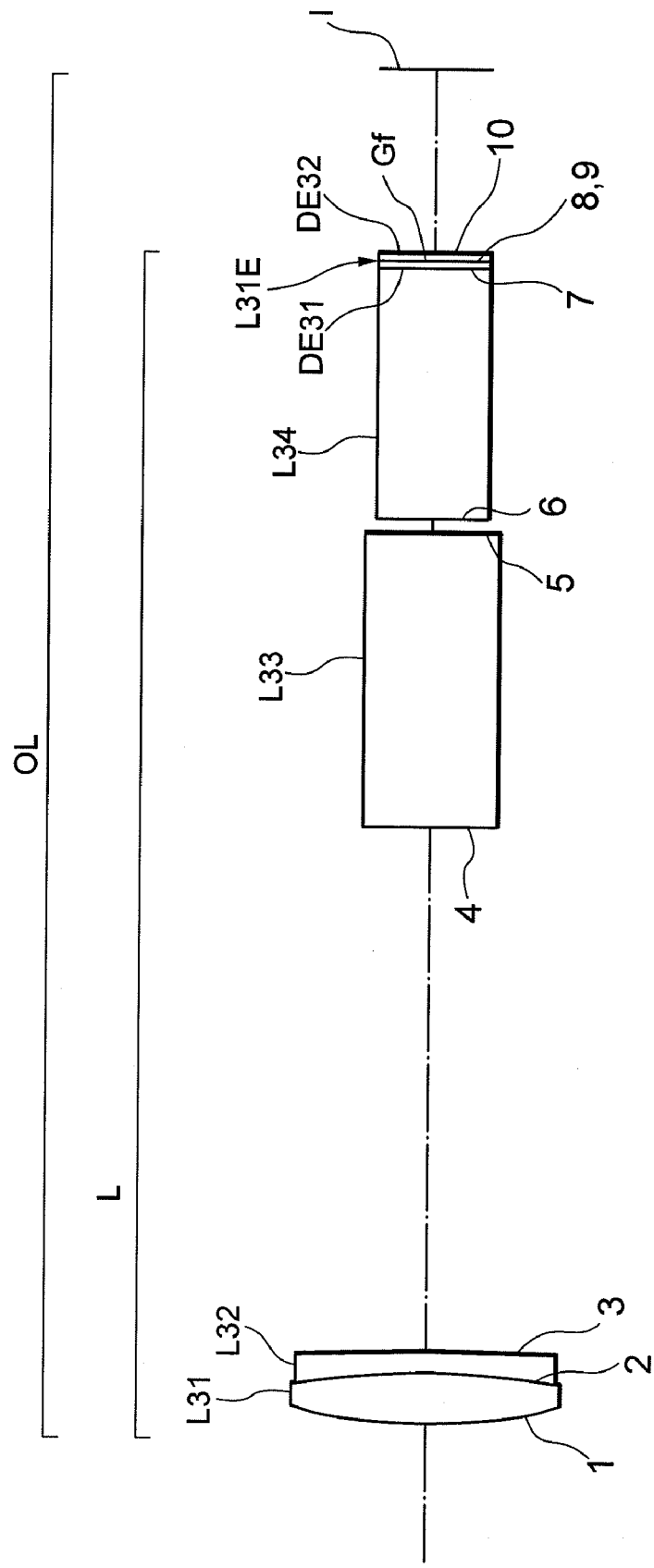
FIG. 5 is a sectional view showing a lens system including an achromatic lens system according to Example 3 of the present invention.

FIG. 5 is a sectional view showing a lens system including an achromatic lens system according to Example 3 of the present invention.

As shown in FIG. 5, a lens system OL equipped with an achromatic lens system L according to the present example is composed of, in order from an object side along an optical axis, the achromatic lens system L, an erecting prism L33, and an erecting prism L34. Although the optical path of the lens system OL is bent by the erecting prisms L33 and L34, it is shown with extending itself in FIG. 5.

The achromatic lens system L is composed of, in order from the object side along the optical axis, a cemented positive resin lens constructed by a double convex positive resin lens L31 cemented with a negative meniscus resin lens L32 having a concave surface facing the object side, and a diffractive optical element L31E formed on an image side surface of the erecting prism L34. An aspherical surface is formed on the image side surface of the negative meniscus resin lens L32.

The diffractive optical element L31E is a close-contact multi-layer type diffractive optical element for excellently correcting chromatic aberration, in particular, longitudinal chromatic aberration and obtaining high diffraction efficiency, and composed of a close-contact structure constructed by, in order from the object side along the optical axis, a first diffractive element member DE31 made of an ultraviolet curing resin material cemented with a second diffractive element member DE32 made of an ultraviolet curing resin material different from that of the first diffractive element member DE31, and the cemented surface becomes a diffractive optical surface Gf on which grooves of a diffraction grating are formed.

Various values associated with the lens system OL equipped with the achromatic lens system according to the present example are listed in Table 4.

TABLE 4

[Specifications]

f = 108.0
FNO = 4.3

[Lens Data]

| Surface Number | r | d | vd | n(d) |
|---|---|---|---|---|
| 1 | 54.4870 | 5.0 | 56.2 | 1.532700 |
| 2 | −128.4389 | 2.0 | 25.6 | 1.613270 |
| 3 | 1111.5822 | 53.3 | | 1.000000 |
| 4 | ∞ | 30.0 | 56.1 | 1.568829 |
| 5 | ∞ | 1.4 | | 1.000000 |
| 6 | ∞ | 26.0 | 56.1 | 1.568829 |
| 7 | ∞ | 0.4 | 50.2 | 1.556900 |
| 8 | ∞ | 0.0 | −3.45 | n1 |
| 9 | ∞ | 0.4 | 34.7 | 1.527600 |
| 10 | ∞ | 18.5 | | 1.000000 |

[Diffractive Optical Element L31E data]

Surface Number = 8
n(d) = 10001.0000 = n1
n(g) = 7418.6853
n(C) = 11170.4255
n(F) = 8274.7311
The number of grooves of the diffraction grating in the diffractive optical surface Gf = 72
Effective radius of the diffractive optical surface Gf = 5.2

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 3

κ = 0.0000
C2 = 0.00000E+00
C4 = 3.31374E−07
C6 = 0.00000E+00
C8 = 0.00000E+00
C10 = 0.00000E+00

Surface Number = 9

κ = 0.0000
C2 = −1.78533E−07
C4 = 8.15657E−10
C6 = 0.00000E+00
C8 = 0.00000E+00
C10 = 0.00000E+00

[Values for Conditional Expressions]

(1) |R/f| = 1.189
(2) N/D = 13.85
(3) nd1 = 1.527600
(4) nF1 − nC1 = 0.0152
(5) nd2 = 1.556900
(6) nF2 − nC2 = 0.011

Figure 6A:
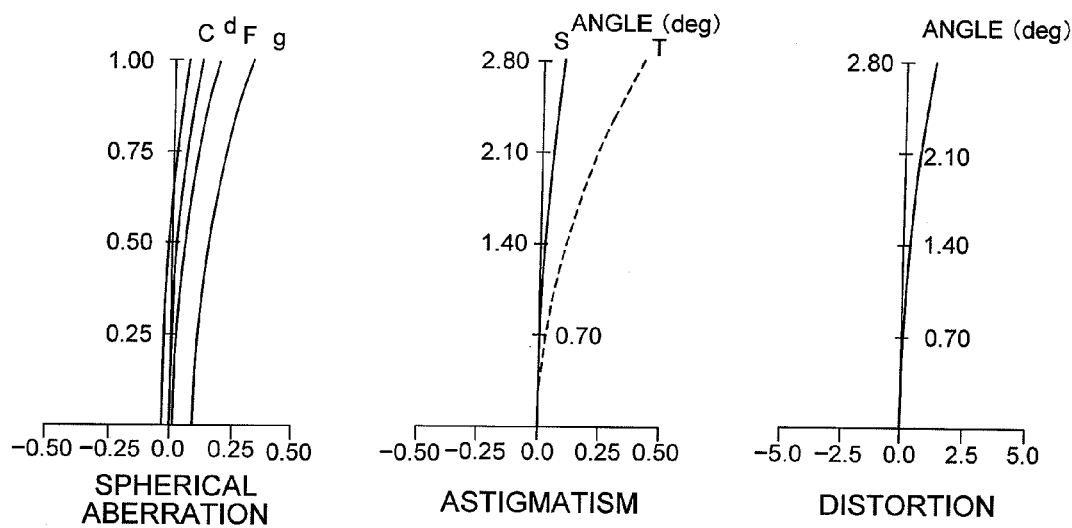
FIGS. 6A and 6B are graphs respectively showing various aberrations and white light MTF values on the optical axis of the lens system including the achromatic lens system according to Example 3 of the present invention.
Figure 6B:
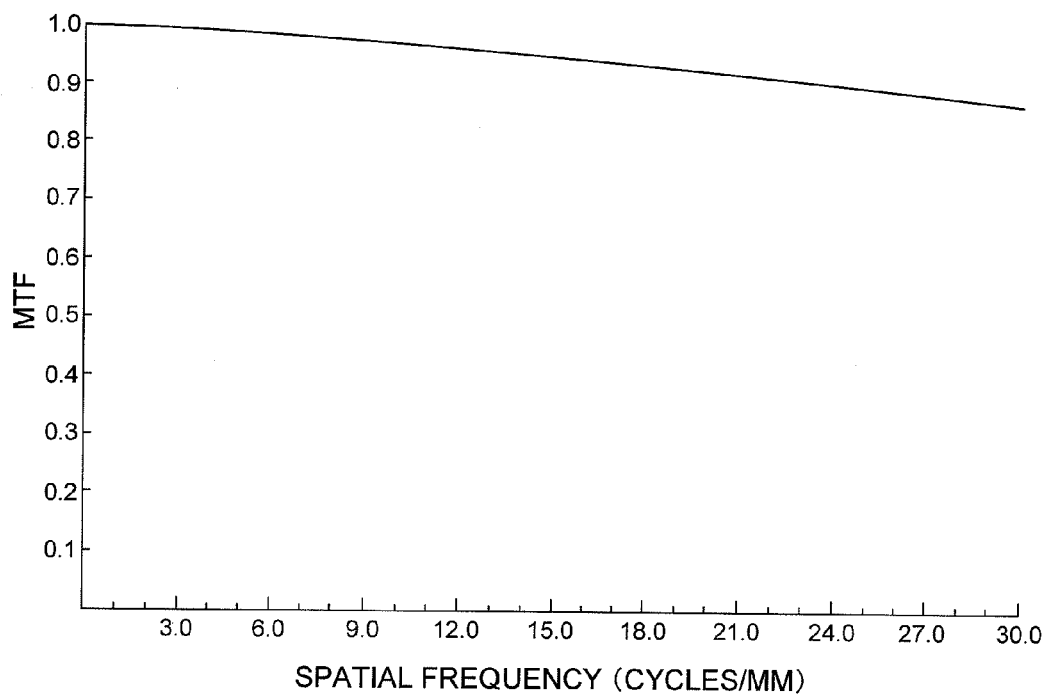

FIGS. 6A and 6B are graphs respectively showing various aberrations and white light MTF values on the optical axis of the lens system including the achromatic lens system according to Example 3 of the present invention.

As is apparent from the respective aberration graphs and white light MTF value of 0.848 with respect to the spatial frequency of 30 lines/mm, the lens system equipped with the achromatic lens system according to the present example shows superb optical performance as a result of excellent corrections to various aberrations in particular to longitudinal chromatic aberration.

In the present example, although the diffractive optical element L31E is formed on the image side surface of the erecting prism L34, it is not limited to this position, and it is possible to be formed on the image side surface of the erecting prism L34.

In the achromatic lens system according to the present example and the above-described each example, although an erecting prism is used each example as an erecting optical system, configuration of an erecting optical system is not limited to this. Regarding an erecting optical system on which a diffractive optical element is not formed, for example, other optical element such as a reflection mirror or the like can be used.

EXAMPLE 4

FIG. 7 is a sectional view showing a lens system including an achromatic lens system according to Example 4 of the present invention.

As shown in FIG. 7, a lens system OL equipped with an achromatic lens system L according to the present example is composed of, in order from an object side along an optical axis, the achromatic lens system L, an erecting prism L43, and an erecting prism L44. Although the optical path of the lens system OL is bent by the erecting prisms L43 and L44, it is shown with extending itself in FIG. 7.

The achromatic lens system L is composed of, in order from the object side along the optical axis, a double convex positive resin lens L41, a diffractive optical element L41E, and a negative meniscus lens L42 having a concave surface facing the object side, and they are cemented with each other, and has positive refractive power as a whole. An aspherical surface is formed on an image side of the negative meniscus lens L42.

The diffractive optical element L41E is a close-contact multi-layer type diffractive optical element for excellently correcting chromatic aberration, in particular, longitudinal chromatic aberration and obtaining high diffraction efficiency, and composed of a close-contact structure constructed by, in order from the object side along the optical axis, a first diffractive element member DE41 made of an ultraviolet curing resin material cemented with a second diffractive element member DE42 made of an ultraviolet curing resin material different from that of the first diffractive element member DE41, and the cemented surface becomes a diffractive optical surface Gf on which grooves of a diffraction grating are formed.

Various values associated with the lens system OL equipped with the achromatic lens system according to the present example are listed in Table 5.

TABLE 5

[Specifications]

| f = | 108.0 |
|---|---|
| FNO = | 4.3 |

[Lens Data]

| Surface Number | r | d | vd | n(d) |
|---|---|---|---|---|
| 1 | 59.2155 | 5.0 | 56.21 | 1.524440 |
| 2 | −62.4785 | 0.4 | 34.71 | 1.527600 |
| 3 | −62.4785 | 0.0 | −3.45 | n1 |
| 4 | −62.4785 | 0.4 | 50.17 | 1.556900 |
| 5 | −62.4785 | 2.0 | 30.33 | 1.582760 |
| 6 | −464.5713 | 47.7 | | 1.000000 |

TABLE 5-continued

| 7 | ∞ | 30.0 | 56.05 | 1.568829 |
| 8 | ∞ | 1.4 | | 1.000000 |
| 9 | ∞ | 26.0 | 56.05 | 1.568829 |
| 10 | ∞ | 18.5 | | 1.000000 |

[Diffractive Optical Element L41E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 11

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 4

κ = 0.0000
C2 = −5.12353E−09
C4 = 6.03747E−12
C6 = 3.00000E−15
C8 = 0.00000E+00
C10 = 0.00000E+00

Surface Number = 6

κ = 0.0000
C2 = 0.00000E+00
C4 = 1.71000E−07
C6 = 0.00000E+00
C8 = 0.00000E+00
C10 = 0.00000E+00

[Values for Conditional Expressions]

(1') |R/f| = 0.579
(2') N/D = 0.88
(3) nd1 = 1.527600
(4) nF1 − nC1 = 0.0152
(5) nd2 = 1.556900
(6) nF2 − nC2 = 0.011

Figure 8A:
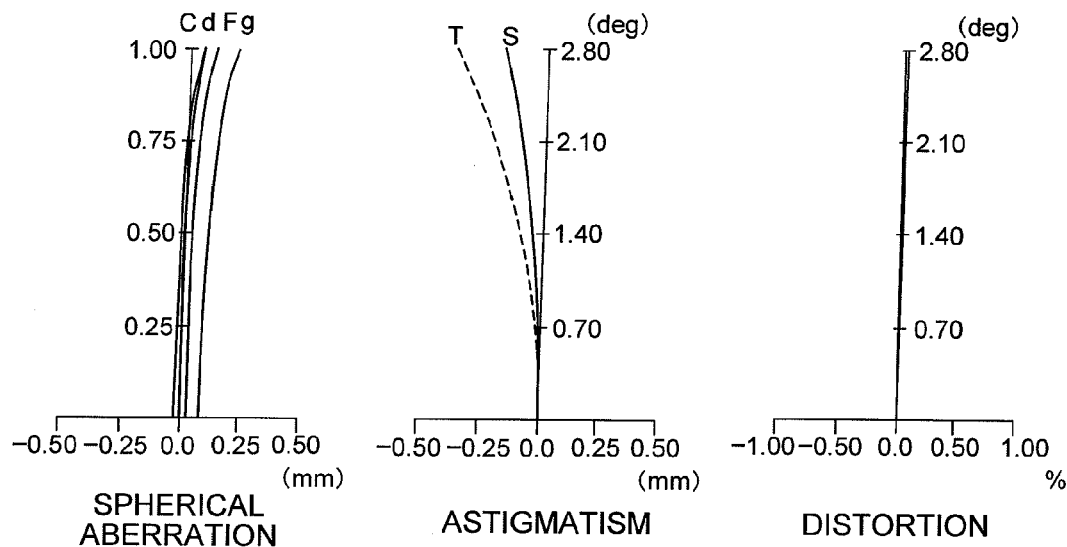
FIGS. 8A and 8B are graphs respectively showing various aberrations and white light MTF values on the optical axis of the lens system including the achromatic lens system according to Example 4 of the present invention.
Figure 8B:
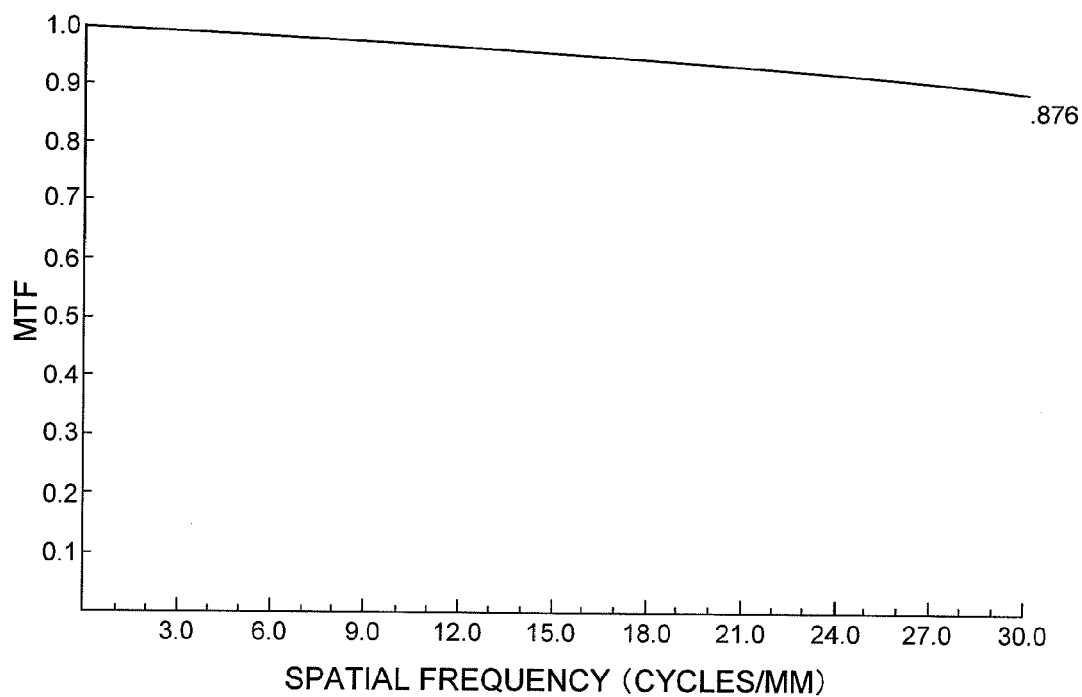

FIGS. 8A and 8B are graphs respectively showing various aberrations and white light MTF values on the optical axis of the lens system including the achromatic lens system according to Example 4 of the present invention.

As is apparent from the respective aberration graphs and white light MTF value of 0.88 with respect to the spatial frequency of 30 lines/mm, the lens system equipped with the achromatic lens system according to the present example shows superb optical performance as a result of excellent corrections to various aberrations in particular to longitudinal chromatic aberration.

EXAMPLE 5

Figure 9:
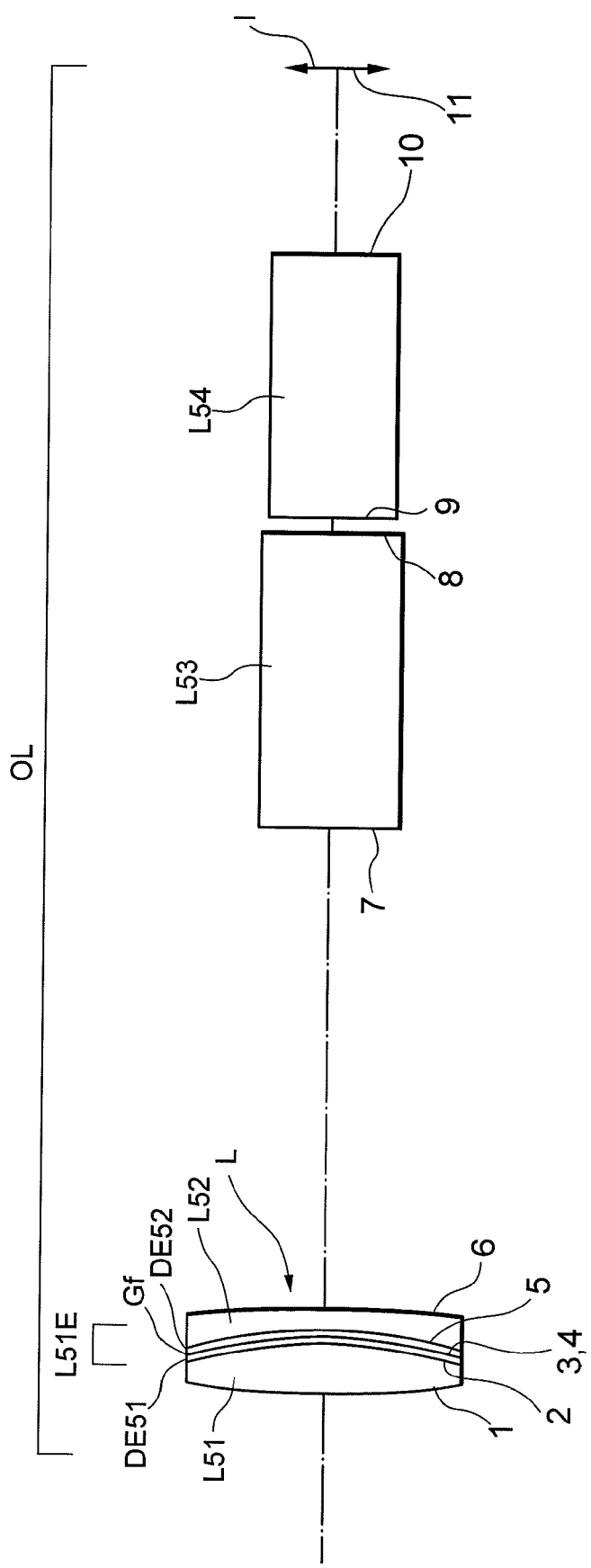
FIG. 9 is a sectional view showing a lens system including an achromatic lens system according to Example 5 of the present invention.

FIG. 9 is a sectional view showing a lens system including an achromatic lens system according to Example 5 of the present invention.

As shown in FIG. 9, a lens system OL equipped with an achromatic lens system L according to the present example is composed of, in order from an object side along an optical axis, the achromatic lens system L, an erecting prism L53, and an erecting prism L54. Although the optical path of the lens system OL is bent by the erecting prisms L53 and L54, it is shown with extending itself in FIG. 9.

The achromatic lens system L is composed of, in order from the object side along the optical axis, a double convex positive resin lens L51, a diffractive optical element L51E, and a negative meniscus lens L52 having a concave surface facing the object side, and they are cemented with each other, and has positive refractive power as a whole. An aspherical surface is formed on an image side of the negative meniscus lens L52.

The diffractive optical element L51E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE51 made of an ultraviolet curing resin material cemented with a second diffractive element member DE52 made of an ultraviolet curing resin material different from that of the first diffractive element member DE51, and the cemented surface becomes a diffractive optical surface Gf on which grooves of a diffraction grating are formed.

Various values associated with the lens system OL equipped with the achromatic lens system according to the present example are listed in Table 6.

TABLE 6

[Specifications]

| | |
|---|---|
| f = | 108.0 |
| FNO = | 4.3 |

[Lens Data]

| Surface Number | r | d | vd | n(d) |
|---|---|---|---|---|
| 1 | 67.2637 | 5.0 | 56.21 | 1.524440 |
| 2 | −53.0000 | 0.4 | 50.17 | 1.556900 |
| 3 | −53.0000 | 0.0 | −3.45 | n1 |
| 4 | −53.0000 | 0.4 | 34.71 | 1.527600 |
| 5 | −53.0000 | 2.0 | 30.33 | 1.582760 |
| 6 | −227.7608 | 48.3 | | 1.000000 |
| 7 | ∞ | 30.0 | 56.05 | 1.568829 |
| 8 | ∞ | 1.4 | | 1.000000 |
| 9 | ∞ | 26.0 | 56.05 | 1.568829 |
| 10 | ∞ | 18.5 | | 1.000000 |

[Diffractive Optical Element L51E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 9

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 4

κ = 0.0000
C2 = −3.62125E−09
C4 = 2.13029E−12
C6 = 3.00000E−15
C8 = 0.00000E+00
C10 = 0.00000E+00

TABLE 6-continued

Surface Number = 6

κ = 0.0000
C2 = 0.00000E+00
C4 = 1.35517E−07
C6 = 0.00000E+00
C8 = 0.00000E+00
C10 = 0.00000E+00

[Values for Conditional Expressions]

(1') |R/f| = 0.491
(2') N/D = 0.72
(3) nd1 = 1.527600
(4) nF1 − nC1 = 0.0152
(5) nd2 = 1.556900
(6) nF2 − nC2 = 0.011

Figure 10A:
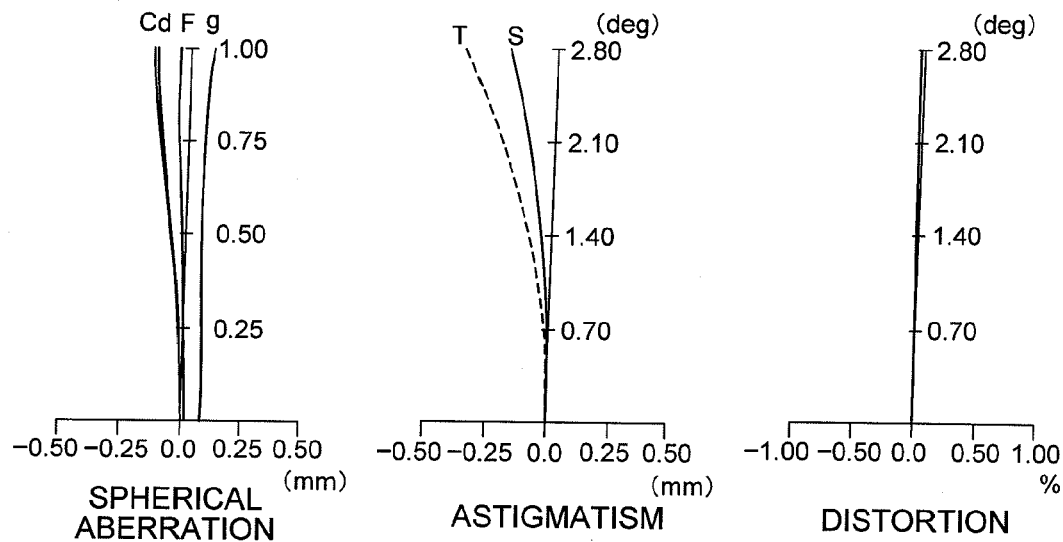
FIGS. 10A and 10B are graphs respectively showing various aberrations and white light MTF values on the optical axis of the lens system including the achromatic lens system according to Example 5 of the present invention.
Figure 10B:
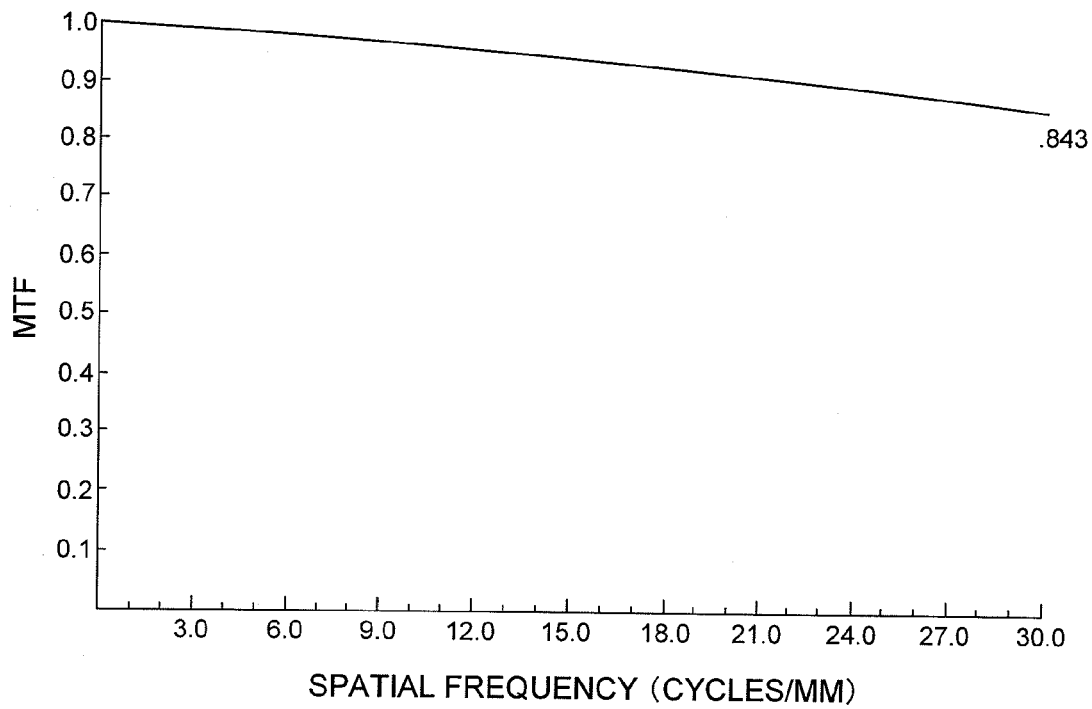

FIGS. 10A and 10B are graphs respectively showing various aberrations and white light MTF values on the optical axis of the lens system including the achromatic lens system according to Example 5 of the present invention.

As is apparent from the respective aberration graphs and white light MTF value of 0.84 with respect to the spatial frequency of 30 lines/mm, the lens system equipped with the achromatic lens system according to the present example shows superb optical performance as a result of excellent corrections to various aberrations in particular to longitudinal chromatic aberration.

EXAMPLE 6

Figure 11:
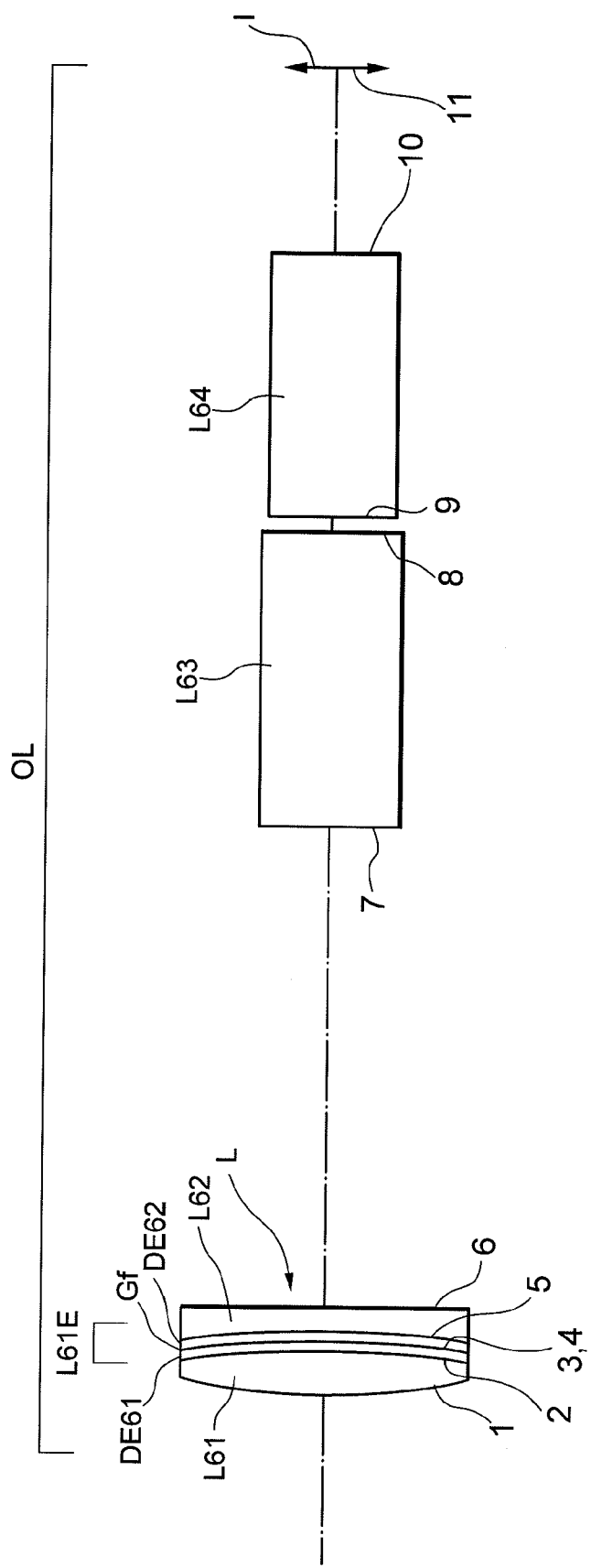
FIG. 11 is a sectional view showing a lens system including an achromatic lens system according to Example 6 of the present invention.

FIG. 11 is a sectional view showing a lens system including an achromatic lens system according to Example 6 of the present invention.

As shown in FIG. 11, a lens system OL equipped with an achromatic lens system L according to the present example is composed of, in order from an object side along an optical axis, the achromatic lens system L, an erecting prism L63, and an erecting prism L64. Although the optical path of the lens system OL is bent by the erecting prisms L63 and L64, it is shown with extending itself in FIG. 11.

The achromatic lens system L is composed of, in order from the object side along the optical axis, a double convex positive resin lens L61, a diffractive optical element L61E, and a negative meniscus lens L62 having a concave surface facing the object side, and they are cemented with each other, and has positive refractive power as a whole. An aspherical surface is formed on an image side of the negative meniscus lens L62.

The diffractive optical element L61E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE61 made of an ultraviolet curing resin material cemented with a second diffractive element member DE62 made of an ultraviolet curing resin material different from that of the first diffractive element member DE61, and the cemented surface becomes a diffractive optical surface Gf on which grooves of a diffraction grating are formed.

Various values associated with the lens system OL equipped with the achromatic lens system according to the present example are listed in Table 7.

TABLE 7

[Specifications]

| | |
|---|---|
| f = | 108.0 |
| FNO = | 4.3 |

[Lens Data]

| Surface Number | r | d | vd | n(d) |
|---|---|---|---|---|
| 1 | 52.4353 | 5.0 | 56.21 | 1.524440 |
| 2 | −100.0000 | 0.4 | 34.71 | 1.527600 |
| 3 | −100.0000 | 0.0 | −3.45 | n1 |
| 4 | −100.0000 | 0.4 | 50.17 | 1.556900 |
| 5 | −100.0000 | 2.0 | 30.33 | 1.582760 |
| 6 | 1496.9158 | 47.0 | | 1.000000 |
| 7 | ∞ | 30.0 | 56.05 | 1.568829 |
| 8 | ∞ | 1.4 | | 1.000000 |
| 9 | ∞ | 26.0 | 56.05 | 1.568829 |
| 10 | ∞ | 18.5 | | 1.000000 |

[Diffractive Optical Element L61E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 19

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 4

κ = 0.0000
C2 = −9.81658E−09
C4 = 1.73327E−11
C6 = 3.00000E−15
C8 = 0.00000E+00
C10 = 0.00000E+00

Surface Number = 6

κ = 0.0000
C2 = 0.00000E+00
C4 = 1.56506E−07
C6 = 0.00000E+00
C8 = 0.00000E+00
C10 = 0.00000E+00

[Values for Conditional Expressions]

(1') |R/f| = 0.926
(2') N/D = 1.52
(3) nd1 = 1.527600
(4) nF1 − nC1 = 0.0152
(5) nd2 = 1.556900
(6) nF2 − nC2 = 0.011

Figure 12A:
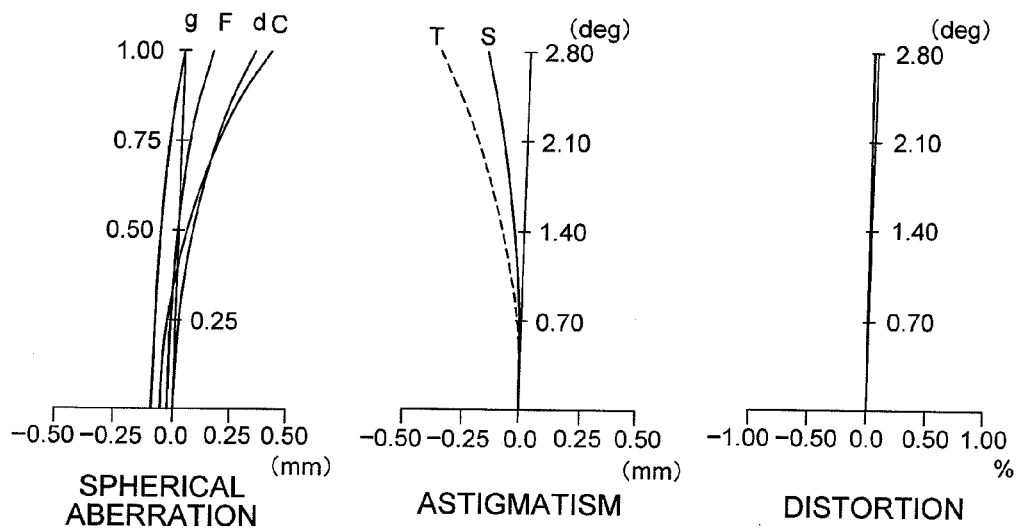
FIGS. 12A and 12B are graphs respectively showing various aberrations and white light MTF values on the optical axis of the lens system including the achromatic lens system according to Example 6 of the present invention.
Figure 12B:
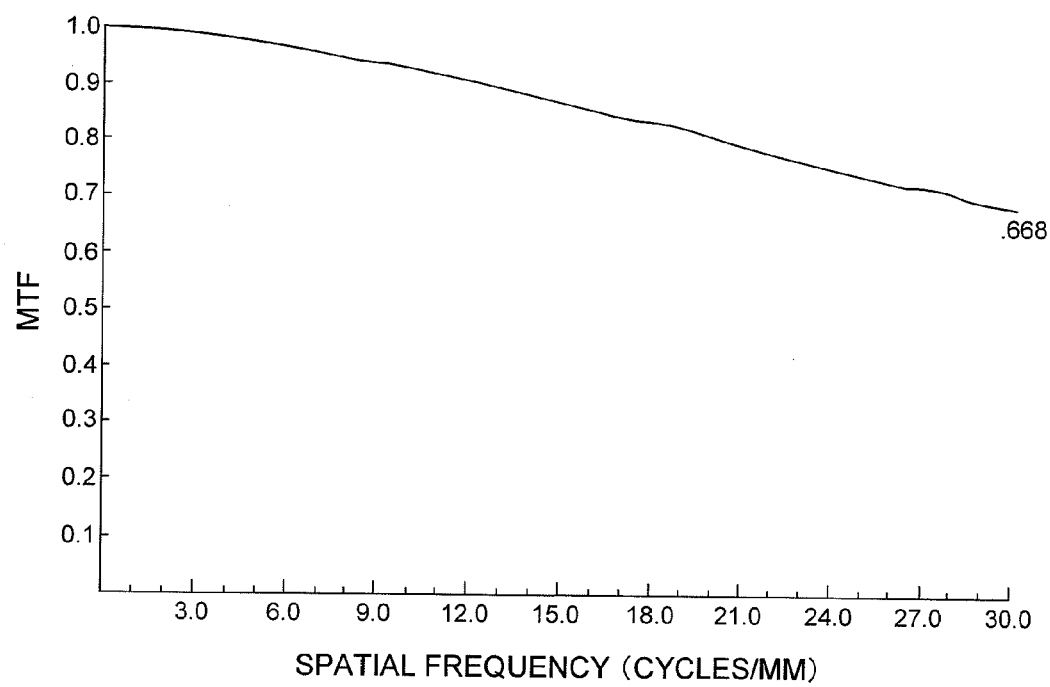

FIGS. 12A and 12B are graphs respectively showing various aberrations and white light MTF values on the optical axis of the lens system including the achromatic lens system according to Example 6 of the present invention.

As is apparent from the respective aberration graphs and white light MTF value of 0.67 with respect to the spatial frequency of 30 lines/mm, the lens system equipped with the achromatic lens system according to the present example shows superb optical performance as a result of excellent corrections to various aberrations in particular to longitudinal chromatic aberration.

EXAMPLE 7

Figure 13:
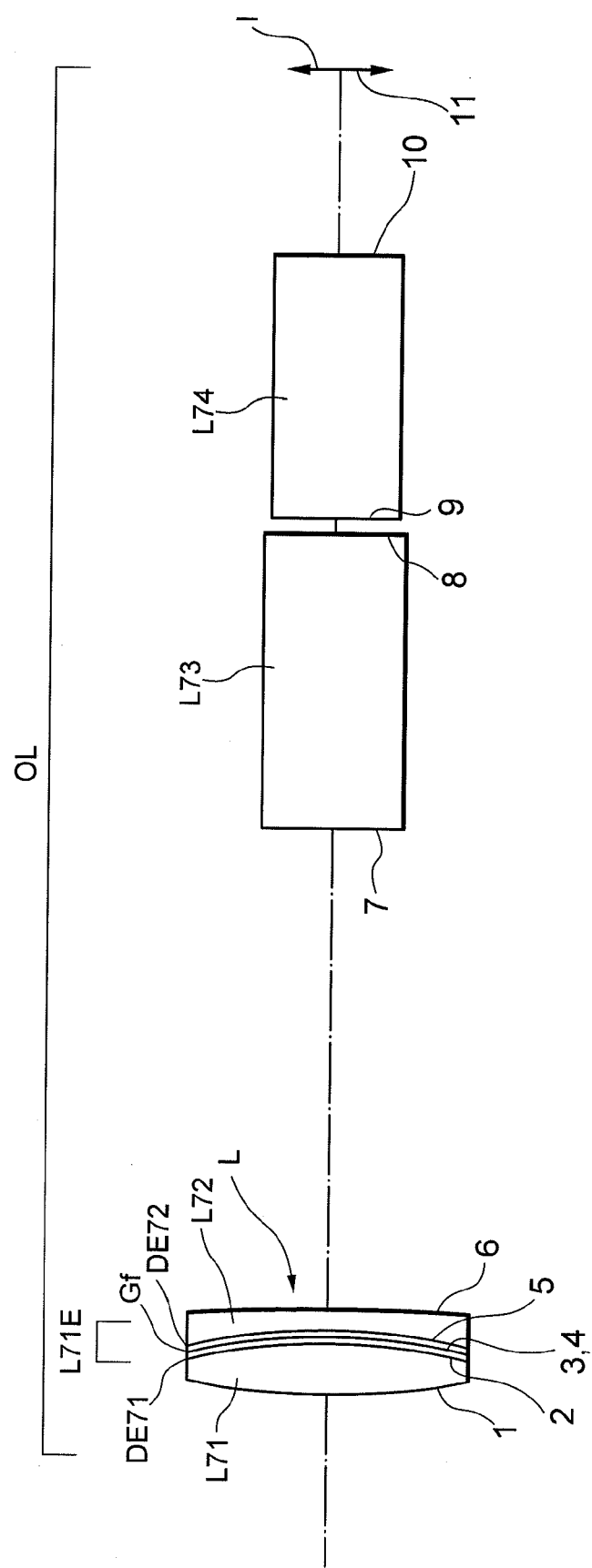
FIG. 13 is a sectional view showing a lens system including an achromatic lens system according to Example 7 of the present invention.

FIG. 13 is a sectional view showing a lens system including an achromatic lens system according to Example 7 of the present invention.

As shown in FIG. 13, a lens system OL equipped with an achromatic lens system L according to the present example is composed of, in order from an object side along an optical axis, the achromatic lens system L, an erecting prism L73, and an erecting prism L74. Although the optical path of the lens system OL is bent by the erecting prisms L73 and L74, it is shown with extending itself in FIG. 13.

The achromatic lens system L is composed of, in order from the object side along the optical axis, a double convex positive resin lens L71, a diffractive optical element L71E, and a negative meniscus lens L72 having a concave surface facing the object side, and they are cemented with each other, and has positive refractive power as a whole.

The diffractive optical element L71E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE71 made of an ultraviolet curing resin material cemented with a second diffractive element member DE72 made of an ultraviolet curing resin material different from that of the first diffractive element member DE71, and the cemented surface becomes a diffractive optical surface Gf on which grooves of a diffraction grating are formed.

Various values associated with the lens system OL equipped with the achromatic lens system according to the present example are listed in Table 8.

TABLE 8

[Specifications]

| | |
|---|---|
| f = | 108.0 |
| FNO = | 4.3 |

[Lens Data]

| Surface Number | r | d | vd | n(d) |
|---|---|---|---|---|
| 1 | 60.4803 | 5.0 | 56.21 | 1.524440 |
| 2 | −61.1264 | 0.4 | 34.71 | 1.527600 |
| 3 | −61.1264 | 0.0 | −3.45 | n1 |
| 4 | −61.1264 | 0.4 | 50.17 | 1.556900 |
| 5 | −61.1264 | 2.0 | 30.33 | 1.582760 |
| 6 | −395.7077 | 47.8 | | 1.000000 |
| 7 | ∞ | 30.0 | 56.05 | 1.568829 |
| 8 | ∞ | 1.4 | | 1.000000 |
| 9 | ∞ | 26.0 | 56.05 | 1.568829 |
| 10 | ∞ | 18.5 | | 1.000000 |

[Diffractive Optical Element L71E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 6

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

TABLE 8-continued

[Aspherical Data]
Surface Number = 4

κ = 0.0000
C2 = −4.92877E−09
C4 = 1.43025E−11
C6 = 4.38851E−15
C8 = 0.00000E+00
C10 = 0.00000E+00

[Values for Conditional Expressions]

(1') |R/f| = 0.566
(2') N/D = 0.48
(3) nd1 = 1.527600
(4) nF1 − nC1 = 0.0152
(5) nd2 = 1.556900
(6) nF2 − nC2 = 0.011

Figure 14A:
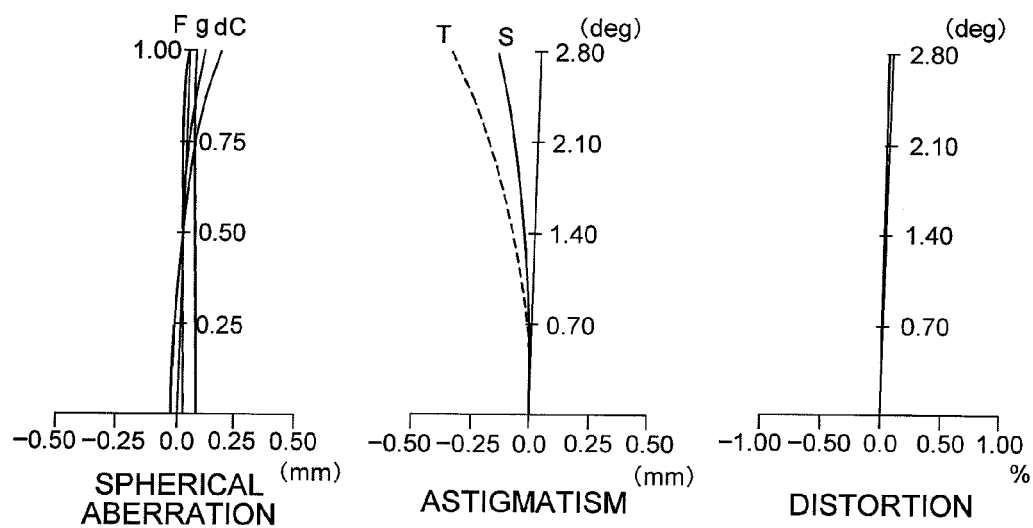
FIGS. 14A and 14B are graphs respectively showing various aberrations and white light MTF values on the optical axis of the lens system including the achromatic lens system according to Example 7 of the present invention.
Figure 14B:
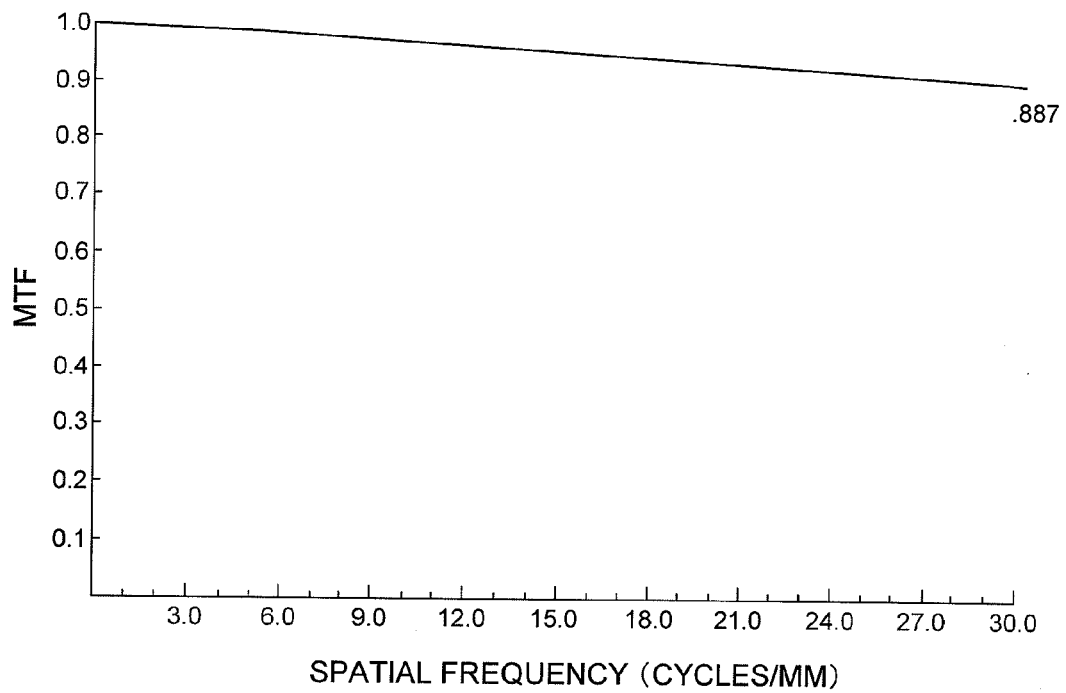

FIGS. 14A and 14B are graphs respectively showing various aberrations and white light MTF values on the optical axis of the lens system including the achromatic lens system according to Example 7 of the present invention.

As is apparent from the respective aberration graphs and white light MTF value of 0.89 with respect to the spatial frequency of 30 lines/mm, the lens system equipped with the achromatic lens system according to the present example shows superb optical performance as a result of excellent corrections to various aberrations in particular to longitudinal chromatic aberration without using an aspherical surface.

EXAMPLE 8

Figure 15:
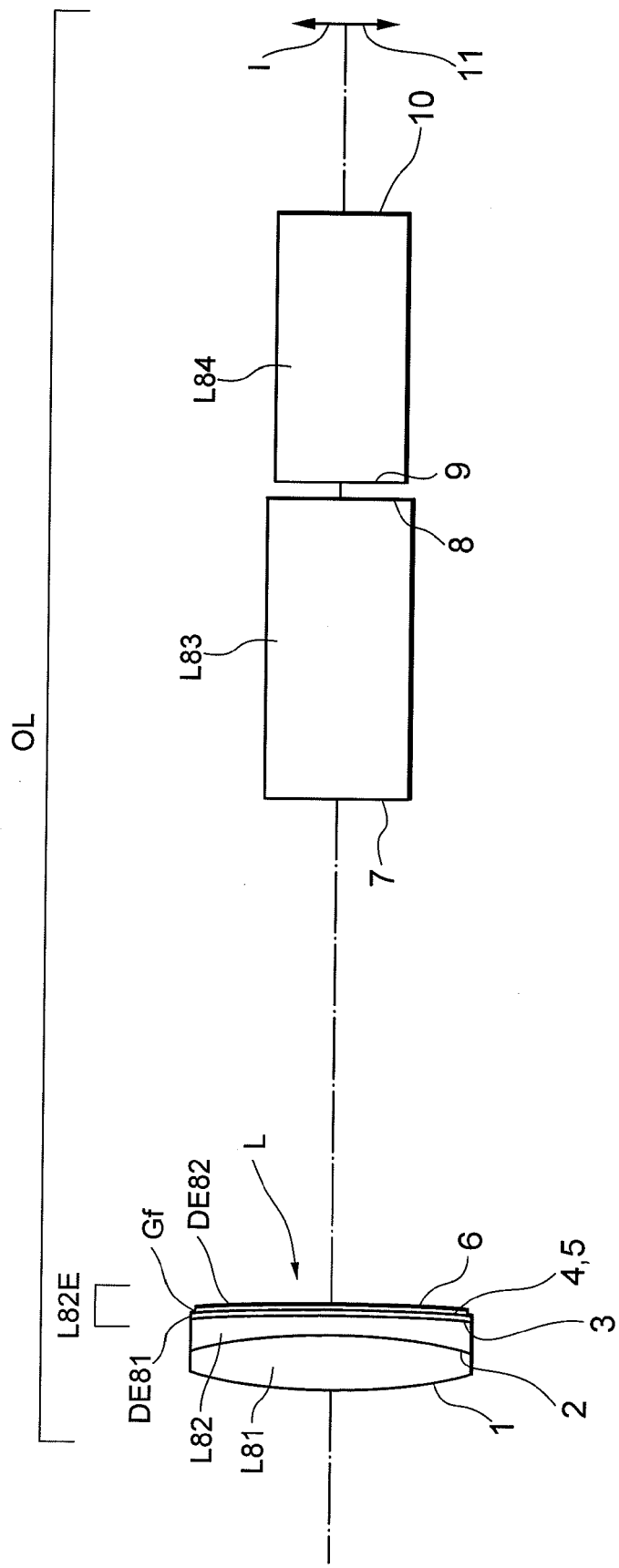
FIG. 15 is a sectional view showing a lens system including an achromatic lens system according to Example 8 of the present invention.

FIG. 15 is a sectional view showing a lens system including an achromatic lens system according to Example 8 of the present invention.

As shown in FIG. 15, a lens system OL equipped with an achromatic lens system L according to the present example is composed of, in order from an object side along an optical axis, the achromatic lens system L, an erecting prism L83, and an erecting prism L84. Although the optical path of the lens system OL is bent by the erecting prisms L83 and L84, it is shown with extending itself in FIG. 15.

The achromatic lens system L is composed of, in order from the object side along the optical axis, a double convex positive resin lens L81, a negative meniscus lens L82 having a concave surface facing the object side, and a diffractive optical element L82E, and they are cemented with each other, and has positive refractive power as a whole.

The diffractive optical element L82E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE81 made of an ultraviolet curing resin material cemented with a second diffractive element member DE82 made of an ultraviolet curing resin material different from that of the first diffractive element member DE81, and the cemented surface becomes a diffractive optical surface Gf on which grooves of a diffraction grating are formed. An aspherical surface is formed on an image side surface of the second diffractive element DE82.

Various values associated with the lens system OL equipped with the achromatic lens system according to the present example are listed in Table 9.

TABLE 9

[Specifications]

f = 108.0
FNO = 4.3

[Lens Data]

| Surface Number | r | d | vd | n(d) |
|---|---|---|---|---|
| 1 | 59.5583 | 5.0 | 56.21 | 1.524440 |
| 2 | −61.4337 | 2.0 | 30.33 | 1.582760 |
| 3 | −439.0598 | 0.4 | 34.71 | 1.527600 |
| 4 | −439.0598 | 0.0 | −3.45 | n1 |
| 5 | −439.0598 | 0.4 | 50.17 | 1.556900 |
| 6 | −439.0598 | 47.9 | | 1.000000 |
| 7 | ∞ | 30.0 | 56.05 | 1.568829 |
| 8 | ∞ | 1.4 | | 1.000000 |
| 9 | ∞ | 26.0 | 56.05 | 1.568829 |
| 10 | ∞ | 18.5 | | 1.000000 |

[Diffractive Optical Element L82E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 11

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 5

κ = 0.0000
C2 = −4.97996E−09
C4 = 5.50019E−12
C6 = 0.00000E−00
C8 = 0.00000E+00
C10 = 0.00000E+00

Surface Number = 6

κ = 0.0000
C2 = 0.00000E+00
C4 = 1.77557E−07
C6 = 0.00000E+00
C8 = 0.00000E+00
C10 = 0.00000E+00

[Values for Conditional Expressions]

(1') |R/f| = 0.569
(2') N/D = 0.88
(3) nd1 = 1.527600
(4) nF1 − nC1 = 0.0152
(5) nd2 = 1.556900
(6) nF2 − nC2 = 0.011

Figure 16A:
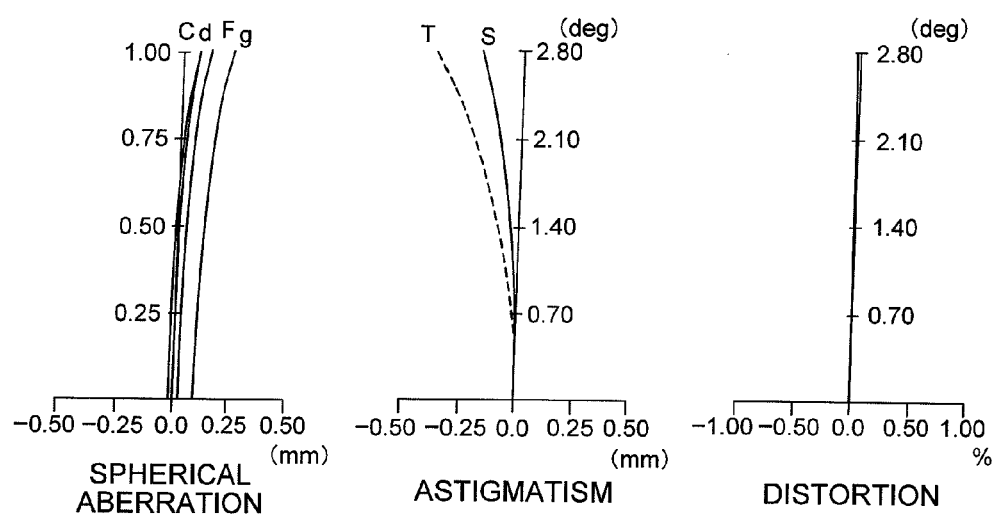
FIGS. 16A and 16B are graphs respectively showing various aberrations and white light MTF values on the optical axis of the lens system including the achromatic lens system according to Example 8 of the present invention.
Figure 16B:
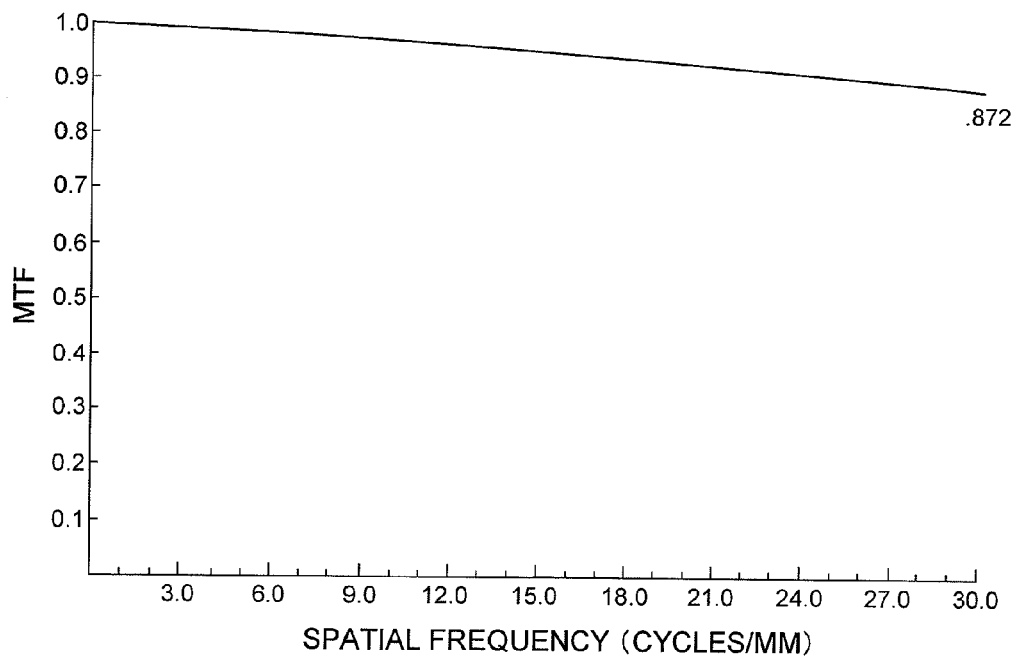

FIGS. 16A and 16B are graphs respectively showing various aberrations and white light MTF values on the optical axis of the lens system including the achromatic lens system according to Example 8 of the present invention.

As is apparent from the respective aberration graphs and white light MTF value of 0.87 with respect to the spatial frequency of 30 lines/mm, the lens system equipped with the achromatic lens system according to the present example shows superb optical performance as a result of excellent corrections to various aberrations in particular to longitudinal chromatic aberration.

EXAMPLE 9

FIG. 17 is a sectional view showing a lens system including an achromatic lens system according to Example 9 of the present invention.

As shown in FIG. 17, a lens system OL equipped with an achromatic lens system L according to the present example is composed of, in order from an object side along an optical axis, only the achromatic lens system L.

The achromatic lens system L is composed of, in order from the object side along the optical axis, a double convex positive resin lens L91, a diffractive optical element L91E, and a negative meniscus lens L92 having a concave surface facing the object side, and they are cemented with each other, and has positive refractive power as a whole. An aspherical surface is formed on an image side of the negative meniscus resin lens L92.

The diffractive optical element L91E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE91 made of an ultraviolet curing resin material cemented with a second diffractive element member DE92 made of an ultraviolet curing resin material different from that of the first diffractive element member DE91, and the cemented surface becomes a diffractive optical surface Gf on which grooves of a diffraction grating are formed.

Various values associated with the lens system OL equipped with the achromatic lens system according to the present example are listed in Table 10.

TABLE 10

[Specifications]

| | |
|---|---|
| f = | 108.0 |
| FNO = | 4.3 |

[Lens Data]

| Surface Number | r | d | vd | n(d) |
|---|---|---|---|---|
| 1 | 55.8603 | 5 | 56.21 | 1.524440 |
| 2 | −66.7059 | 0.4 | 34.71 | 1.527600 |
| 3 | −66.7059 | 0 | −3.45 | n1 |
| 4 | −66.7059 | 0.4 | 50.17 | 1.556900 |
| 5 | −66.7059 | 2 | 30.33 | 1.582760 |
| 6 | −1018.0615 | 103 | | 1.000000 |
| 7 | ∞ | 0 | | |

[Diffractive Optical Element L91E data]

Surface Number = 3
n(d) = 10001.0000 = n1
n(g) = 7418.6853
n(C) = 11170.4255
n(F) = 8274.7311
The number of grooves of the diffraction grating in the diffractive optical surface Gf = 20

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

TABLE 10-continued

[Aspherical Data]

Surface Number = 4

κ = 0.0000
C2 = −8.76759E−09
C4 = 7.37312E−12
C6 = 3.00000E−15
C8 = 0.00000E+00
C10 = 0.00000E+00

Surface Number = 6

κ = 8.0000
C2 = 0.00000E+00
C4 = 2.22226E−07
C6 = −9.09884E−11
C8 = 1.00000E−13
C10 = 1.00000E−15

[Values for Conditional Expressions]

(1') |R/f| = 0.618
(2') N/D = 1.6
(3) nd1 = 1.527600
(4) nF1 − nC1 = 0.0152
(5) nd2 = 1.556900
(6) nF2 − nC2 = 0.011

Figure 18A:
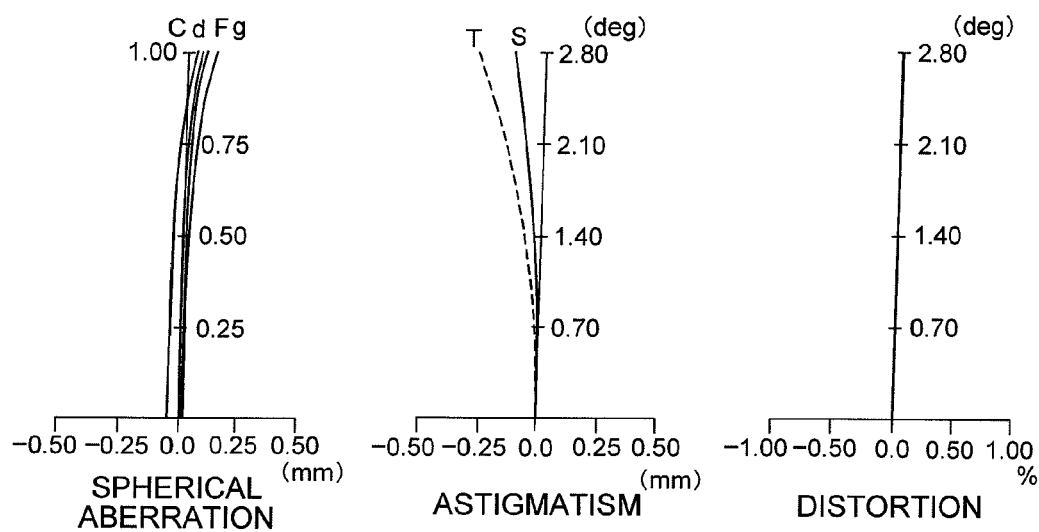
FIGS. 18A and 18B are graphs respectively showing various aberrations and white light MTF values on the optical axis of the lens system including the achromatic lens system according to Example 9 of the present invention.
Figure 18B:
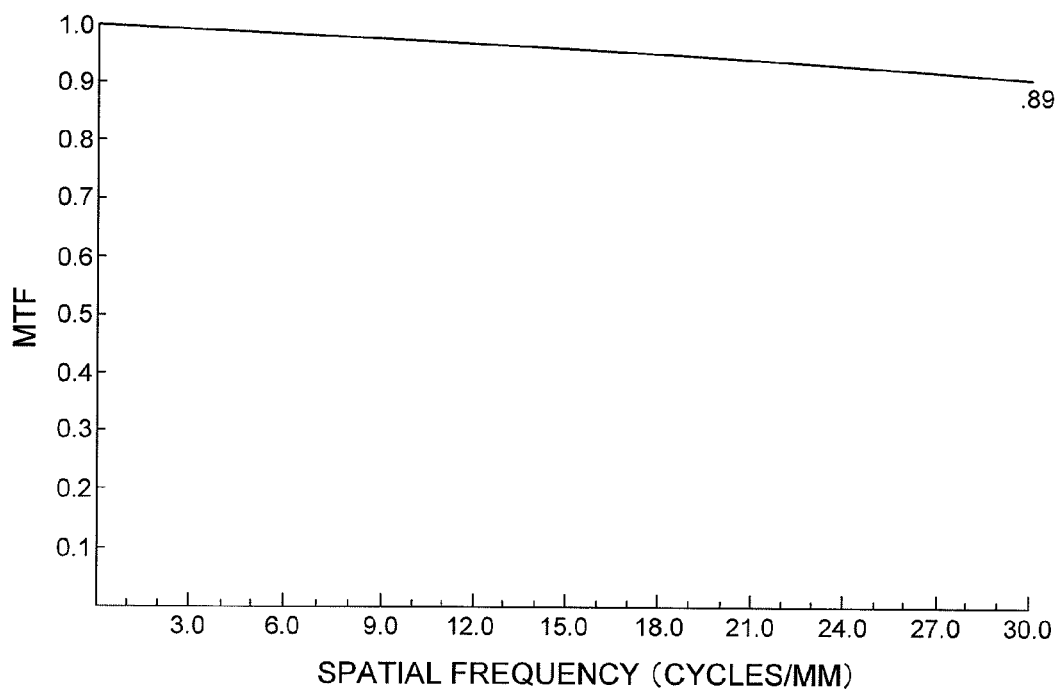

FIGS. 18A and 18B are graphs respectively showing various aberrations and white light MTF values on the optical axis of the lens system including the achromatic lens system according to Example 9 of the present invention.

As is apparent from the respective aberration graphs and white light MTF value of 0.89 with respect to the spatial frequency of 30 lines/mm, the lens system equipped with the achromatic lens system according to the present example shows superb optical performance as a result of excellent corrections to various aberrations in particular to longitudinal chromatic aberration. The lens system equipped with the achromatic lens system according to the present example may have a mirror prism as an erecting optical system between the achromatic lens system and the image plane I.

EXAMPLE 10

Figure 19:
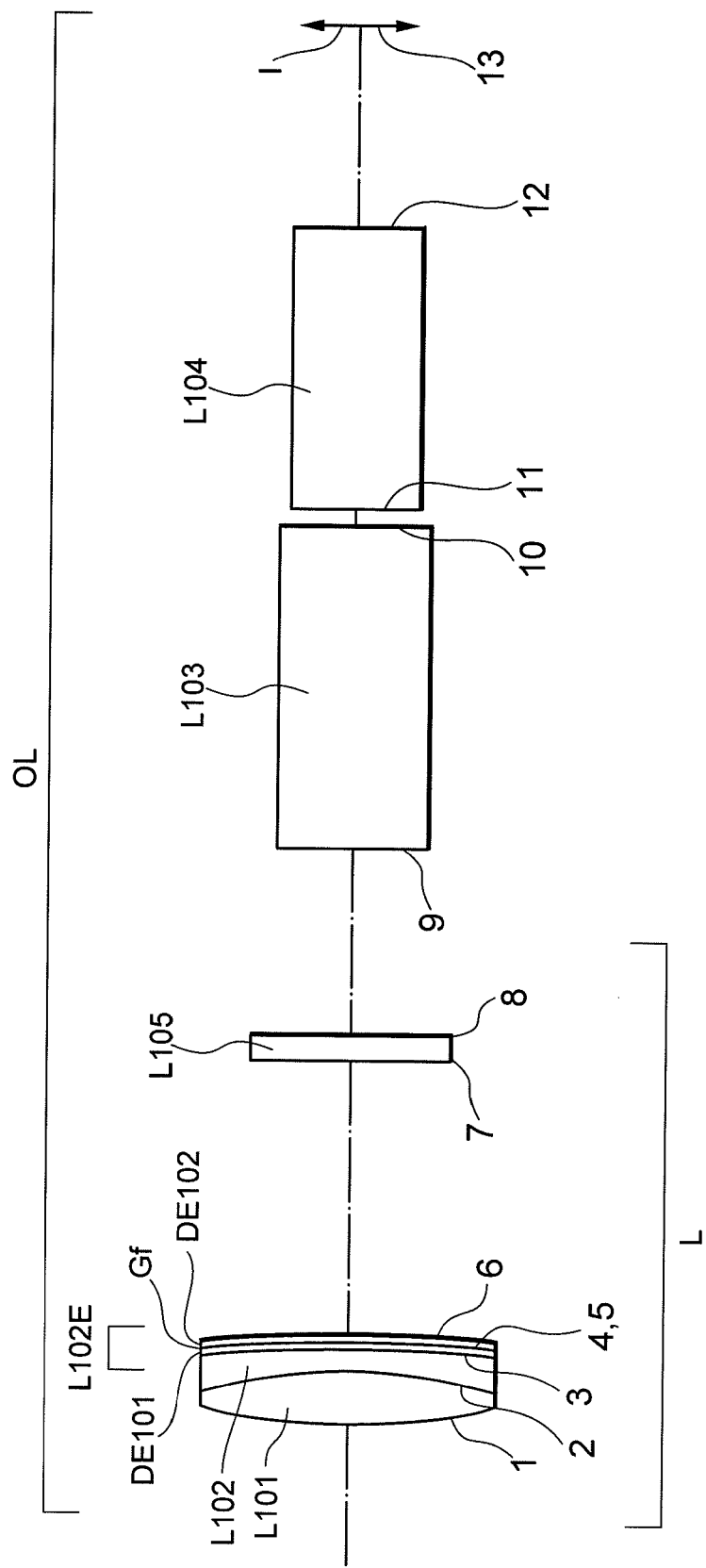
FIG. 19 is a sectional view showing a lens system including an achromatic lens system according to Example 10 of the present invention.

FIG. 19 is a sectional view showing a lens system including an achromatic lens system according to Example 10 of the present invention.

As shown in FIG. 19, a lens system OL equipped with an achromatic lens system L according to the present example is composed of, in order from an object side along an optical axis, the achromatic lens system L, an erecting prism L103, and an erecting prism L104. Although the optical path of the lens system OL is bent by the erecting prisms L103 and L104, it is shown with extending itself in FIG. 19.

The achromatic lens system L is composed of, in order from the object side along the optical axis, a double convex positive resin lens L101, a negative meniscus lens L102 having a concave surface facing the object side, a diffractive optical element L102E, and a plano-concave lens L105 having a concave surface facing an image side, and the positive resin lens L101, the negative resin lens L102, and the diffractive optical element L102E are cemented with each other. The achromatic lens system L has positive refractive power as a whole, and the image position can be made fine adjustment by moving the plano-concave lens L105 along the optical axis.

The diffractive optical element L102E is a close-contact multi-layer type diffractive optical element for excellently correcting chromatic aberration, in particular, longitudinal chromatic aberration, and composed of a close-contact structure constructed by, in order from the object side along the optical axis, a first diffractive element member DE101 made of an ultraviolet curing resin material cemented with a second diffractive element member DE102 made of an ultraviolet curing resin material different from that of the first diffractive element member DE101, and the cemented surface becomes a diffractive optical surface Gf on which grooves of a diffraction grating are formed. An aspherical surface is formed on the image side surface of the second diffractive element DE102.

Various values associated with the lens system OL equipped with the achromatic lens system according to the present example are listed in Table 11.

TABLE 11

[Specifications]

| f = | 108.0 |
|---|---|
| FNO = | 4.3 |

[Lens Data]

| Surface Number | r | d | νd | n(d) |
|---|---|---|---|---|
| 1 | 56.8960 | 5.0 | 56.21 | 1.524440 |
| 2 | −50.0456 | 2.0 | 30.33 | 1.582760 |
| 3 | −233.9456 | 0.4 | 34.71 | 1.527600 |
| 4 | −233.9456 | 0.0 | −3.45 | n1 |
| 5 | −233.9456 | 0.4 | 50.17 | 1.556900 |
| 6 | −233.9456 | 25.3 | | 1.000000 |
| 7 | ∞ | 2.0 | 64.17 | 1.516800 |
| 8 | 275.3115 | 17.3 | | 1.000000 |
| 9 | ∞ | 30.0 | 56.05 | 1.568829 |
| 10 | ∞ | 1.4 | | 1.000000 |
| 11 | ∞ | 26.0 | 56.05 | 1.568829 |
| 12 | ∞ | 18.5 | | 1.000000 |

[Diffractive Optical Element L102E data]

Surface Number = 4
n(d) = 10001.0000 = n1
n(g) = 7418.6853
n(C) = 11170.4255
n(F) = 8274.7311
The number of grooves of the diffraction grating in the diffractive optical surface Gf = 5

[Refractive index of the resin material]

| | nC | nd | nF |
|---|---|---|---|
| lower index | 1.523300 | 1.527600 | 1.538500 |
| higher index | 1.553700 | 1.556900 | 1.564800 |

[Aspherical Data]

Surface Number = 5

κ = 0.0000
C2 = −3.061184E−09
C4 = 5.43278E−12
C6 = 0.00000E+00
C8 = 0.00000E+00
C10 = 0.00000E+00

Surface Number = 6

κ = 0.0000
C2 = 0.00000E+00
C4 = 2.08490E−07
C6 = 0.00000E+00
C8 = 0.00000E+00
C10 = 0.00000E+00

TABLE 11-continued

[Values for Conditional Expressions]

(1') |R/f| = 0.463
(2') N/D = 0.40
(3) nd1 = 1.527600
(4) nF1 − nC1 = 0.0152
(5) nd2 = 1.556900
(6) nF2 − nC2 = 0.011

Figure 20A:
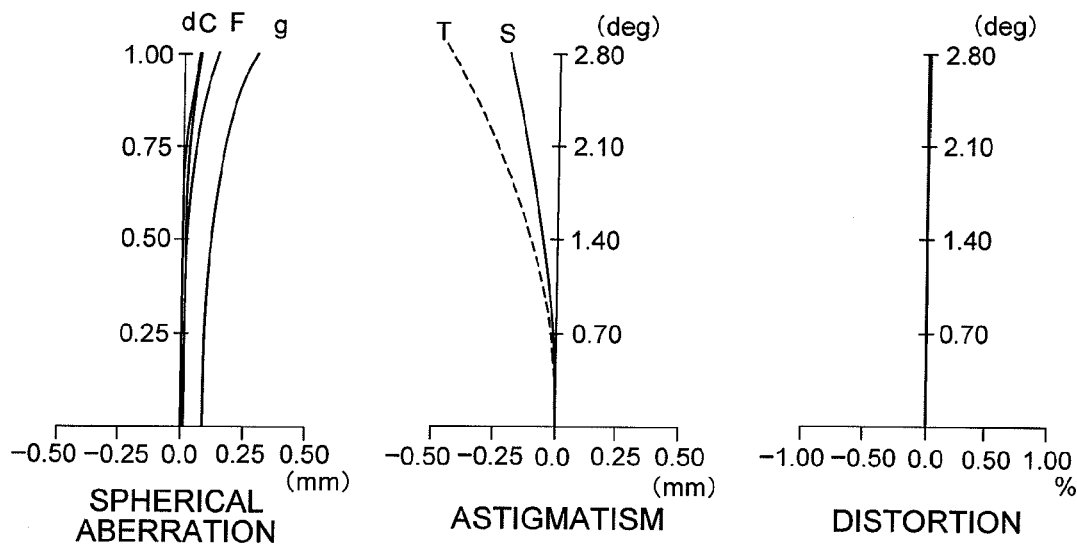
FIGS. 20A and 20B are graphs respectively showing various aberrations and white light MTF values on the optical axis of the lens system including the achromatic lens system according to Example 10 of the present invention.
Figure 20B:
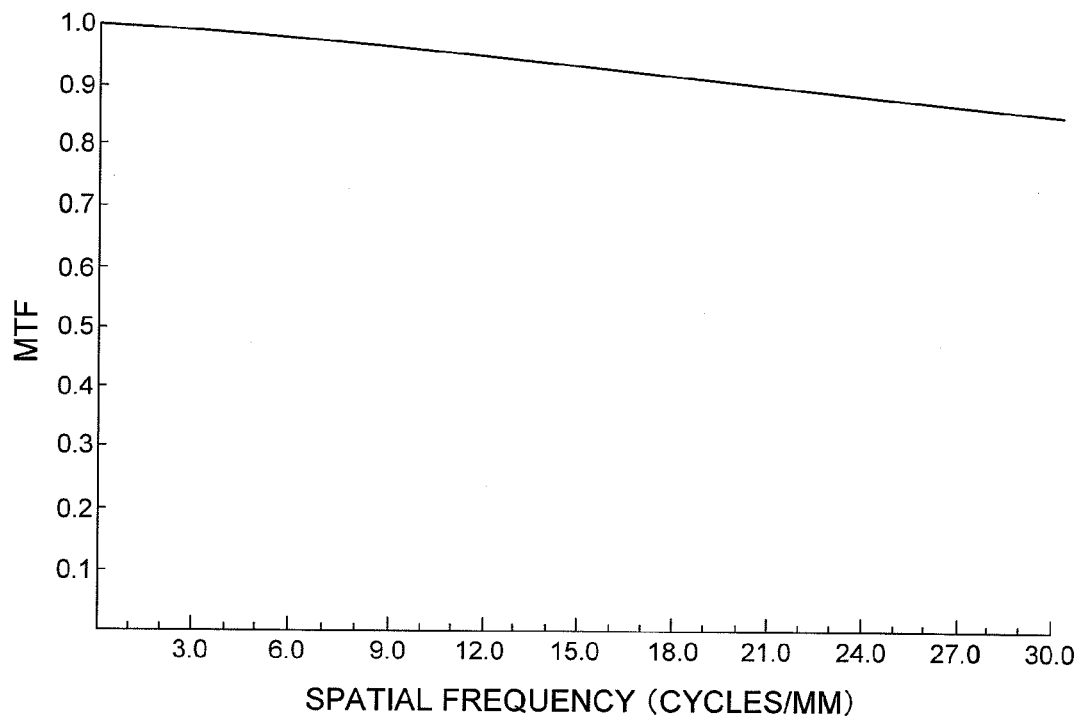

FIGS. 20A and 20B are graphs respectively showing various aberrations and white light MTF values on the optical axis of the lens system including the achromatic lens system according to Example 10 of the present invention.

As is apparent from the respective aberration graphs and white light MTF value of 0.842 with respect to the spatial frequency of 30 lines/mm, the lens system equipped with the achromatic lens system according to the present example shows superb optical performance as a result of excellent corrections to various aberrations in particular to longitudinal chromatic aberration.

As described above, by using resin lens, the achromatic lens system according to each example makes it possible to realize to be lightweight about one third of a conventional achromatic lens system using glass lenses. By using a cemented lens and a close-contact multi-layer type diffracting optical element that has excellent diffraction efficiency over a using wavelength range, an achromatic lens system according to the present invention makes it possible to be lightweight and easy to be manufactured, and to excellently correct chromatic aberration and spherical aberration as well. In this manner, an achromatic lens system capable of excellently correcting chromatic aberration, being lightweight and easy to be manufactured, suitable for, in particular, a telescopic objective lens, a camera lens, a microscope objective lens, and the like can be realized.

Then, a pair of binoculars equipped with an achromatic lens system according to the present invention is explained with reference to FIG. 21.

Figure 21:
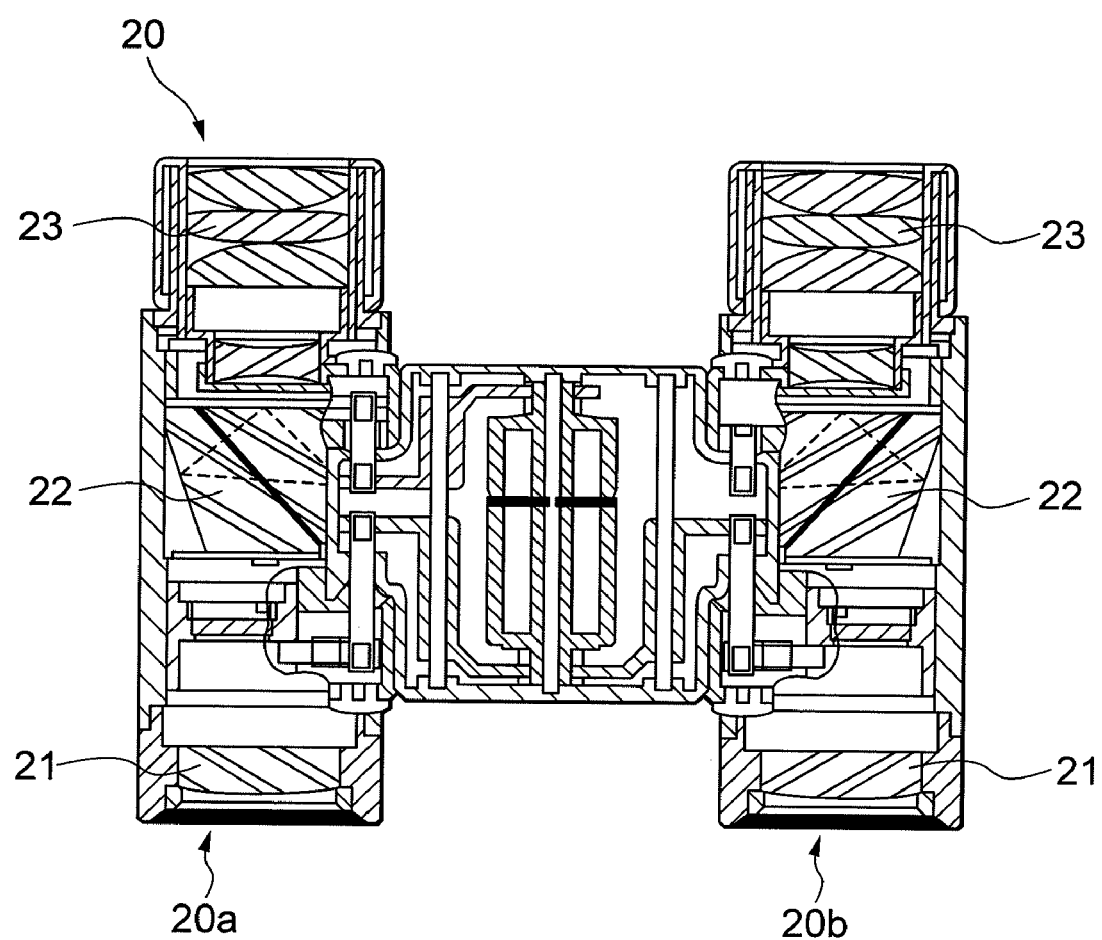
FIG. 21 is a view showing a construction of a pair of binoculars equipped with the achromatic lens system according to the present invention.

FIG. 21 is a view showing a construction of a pair of binoculars equipped with the achromatic lens system according to the present invention.

The pair of binoculars 20 is a pair of binoculars equipped with the achromatic lens system according to Example 1 as an objective lens 21 explained later.

As shown in FIG. 21, the pair of binoculars includes a pair of left and right observation lens barrels 20a, 20b, corresponding to observer's left and right eyes, each of which is provided with, in order from an observation object side along an optical axis, an objective lens 21, an erecting optical system 22, and an eyepiece 23. With this configuration, light from the observation object is converged by the objective lens system 21 to form an object image. After erecting the object image by the erecting optical system 22, the object image is enlarged by the eyepiece lens 23. Accordingly, the observer can carry out enlarged observation of the observation object.

Here, the achromatic lens system according to Example 1 installed on the pair of binoculars 20 as the objective lens 21 is easy to be manufactured and lightweight, capable of excellently correcting chromatic aberration and spherical aberration at the same time by the distinctive lens configuration as explained above in Example 1. Accordingly, the pair of binoculars 20 makes it possible to realize to be easy to be manufactured and lightweight, capable of excellently correcting chromatic aberration and spherical aberration at the same time.

When a pair of binoculars is constructed by installing the achromatic lens system according to any one of Example 2 through 10 as an objective lens 21, the same effect as the above-described pair of binoculars 20 can be obtained.

Moreover, although a pair of binoculars is shown as an example of an optical apparatus equipped with the achromatic lens system according to the present invention, the optical apparatus is not limited to this, so that an achromatic lens system according to the present invention can undoubtedly be applied to a telescope, a camera, a microscope, and the like.

As described above, the present invention makes it possible to provide an achromatic lens system being lightweight and easily manufactured, capable of excellently correcting chromatic aberration and spherical aberration at the same time, and an optical apparatus using the same.

What is claimed is:

1. An achromatic lens system comprising:
    a cemented resin lens having positive refractive power constructed by a resin lens having positive refractive power cemented with a resin lens having negative refractive power; and
    a close-contact multi-layer type diffractive optical element provided to an image side of the cemented resin lens, wherein the following conditional expression is satisfied:

$$0.2 \leq |R/f| \leq 1.8$$

where R denotes a radius of curvature of the cemented surface of the cemented resin lens, and f denotes a focal length of the achromatic lens system.

2. The achromatic lens system according to claim 1, wherein the following conditional expression is satisfied:

$$1.9 \leq N/D \leq 15$$

where N denotes the number of grooves of a diffraction grating formed on a diffractive optical surface of the diffractive optical element, and D denotes an effective radius of the diffractive optical surface of the diffractive optical element.

3. The achromatic lens system according to claim 1, wherein two diffractive element members composing the diffractive optical element are made of different materials, and at least one of the two diffractive element members is made of an ultraviolet curing resin material.

4. The achromatic lens system according to claim 3, wherein the following conditional expressions are satisfied:

$$nd1 \leq 1.54$$

$$0.0145 \leq nF1 - nC1$$

$$1.55 \leq nd2$$

$$nF2 - nC2 \leq 0.013$$

where nd1 denotes a refractive index of a material of the diffractive element member having a lower refractive index and a smaller Abbe number among the two diffractive element members of the diffractive optical element at d-line (wavelength λ=587.562 nm), nF1 denotes a refractive index of a material of the diffractive element member having a lower refractive index and a smaller Abbe number among the two diffractive element members of the diffractive optical element at F-line (wavelength λ=486.133 nm), nC1 denotes a refractive index of a material of the diffractive element member having a lower refractive index and a smaller Abbe number among the two diffractive element members of the diffractive optical element at C-line (wavelength λ=656.273 nm), nd2 denotes a refractive index of a material of the diffractive element member having a higher refractive index and a larger Abbe number among the two diffractive element members of the diffractive optical element at d-line (wavelength λ=587.562 nm), nF2 denotes a refractive index of a material of the diffractive element member having a higher refractive index and a larger Abbe number among the two diffractive element members of the diffractive optical element at F-line (wavelength λ=486.133 nm), and nC2 denotes a refractive index of a material of the diffractive element member having a higher refractive index and a larger Abbe number among the two diffractive element members of the diffractive optical element at C-line (wavelength λ=656.273 nm).

5. The achromatic lens system according to claim 3, wherein the achromatic lens system includes at least one aspherical surface.

6. An optical apparatus equipped with the achromatic lens system according to claim 3.

* * * * *